United States Patent
Yamada

(10) Patent No.: US 7,537,850 B2
(45) Date of Patent: May 26, 2009

(54) FUEL CELL DEVICE AND RELATED CONTROL METHOD

(75) Inventor: Kazuhiro Yamada, Miura (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 315 days.

(21) Appl. No.: 10/501,097

(22) PCT Filed: Aug. 7, 2003

(86) PCT No.: PCT/JP03/10067

§ 371 (c)(1),
(2), (4) Date: Jul. 9, 2004

(87) PCT Pub. No.: WO2004/021493

PCT Pub. Date: Mar. 11, 2004

(65) Prior Publication Data

US 2005/0118473 A1 Jun. 2, 2005

(30) Foreign Application Priority Data

Aug. 27, 2002 (JP) .............................. 2002-246873

(51) Int. Cl.
*H01M 8/04* (2006.01)
(52) U.S. Cl. .............................. 429/26; 429/24; 429/34
(58) Field of Classification Search ........................ None
See application file for complete search history.

(56) References Cited

U.S. PATENT DOCUMENTS

| | | | | |
|---|---|---|---|---|
| 4,818,845 A | * | 4/1989 | Koizumi et al. ............. | 392/462 |
| 5,421,475 A | * | 6/1995 | Nelson ................... | 220/592.25 |
| 5,482,790 A | * | 1/1996 | Yamada et al. ............... | 429/9 |
| 5,772,113 A | * | 6/1998 | Gerstmann et al. .......... | 237/8 R |
| 6,248,462 B1 | * | 6/2001 | Bonville ....................... | 429/24 |
| 6,432,568 B1 | * | 8/2002 | Salvador et al. ............... | 429/19 |
| 6,699,612 B2 | * | 3/2004 | Breault et al. ................. | 429/26 |
| 2001/0055707 A1 | * | 12/2001 | Roberts et al. ................ | 429/30 |
| 2003/0129470 A1 | | 7/2003 | Tajima et al. | |

FOREIGN PATENT DOCUMENTS

| | | | |
|---|---|---|---|
| EP | 0 823 743 A2 | | 2/1998 |
| EP | 1 369 944 A2 | | 12/2003 |
| JP | 2000-149970 | * | 5/2000 |
| JP | 2000-149970 A | | 5/2000 |
| JP | 2000-164233 | * | 6/2000 |
| JP | 2000-164233 A | | 6/2000 |
| JP | 2002-367646 | * | 12/2002 |
| WO | WO 01/71837 A1 | | 9/2001 |

* cited by examiner

*Primary Examiner*—Jonathan Crepeau
*Assistant Examiner*—Tony Chuo
(74) *Attorney, Agent, or Firm*—Foley & Lardner LLP

(57) ABSTRACT

A fuel cell device and related control method are disclosed wherein a water tank 5 is disposed downstream of a fuel cell stack 1 and a hot medium flow passage 25 is formed on an outer periphery of the water tank 5 to pass antifreeze solution. During cold start-up, a three-way vale 13 is switched over to allow antifreeze solution to flow through the fuel cell stack 1 and a heat exchanger 17, by which antifreeze solution is heated and supplied to the fuel cell stack 1 and the water tank 5 to heat these components, whereby the water tank 5 is heated to thaw frozen ice.

17 Claims, 18 Drawing Sheets

FUEL CELL DEVICE AND RELATED CONTROL METHOD

TECHNICAL FIELD

The present invention relates to a fuel cell device equipped with a water storage means that stores water required for a fuel cell.

BACKGROUND ART

In cases where water becomes frozen in a water tank during a cold time, to rapidly thaw such a frozen state needs for permitting water to be quickly supplied to the fuel cell.

In this respect, Japanese Application Laid-Open No. 2000-149970 discloses a fuel cell device which includes a water tank to supply water to the fuel cell, with the water tank employing a double-layer structure adapted to be heated by a heater.

DISCLOSURE OF THE INVENTION

However, although the heater of the fuel cell device is incorporated in a heat insulation material through which the water tank is heated, when thawing ice in the water tank a poor heat conductivity results in between the water tank and the heater, with a resultant inability caused in efficiently heating the water tank.

Therefore, it is an object of the present invention to provide a fuel cell device and a related control method for efficiently and rapidly thawing frozen ice in a water tank.

To achieve the object, a first aspect of the present invention is a fuel cell device comprising a fuel cell cooled by antifreeze solution, an antifreeze circulation flow passage to allow the antifreeze solution to be circulated, an antifreeze heater disposed in a midway of the antifreeze circulation flow passage to heat the antifreeze solution, a water storage unit that stores water to be supplied to the fuel cell, and a hot medium flow passage disposed in a water contact section of the water storage unit to allow the antifreeze solution, heated by the antifreeze heater, to flow.

A second aspect of the present invention is a method of controlling a fuel cell device, the method comprising preparing a fuel cell, preparing a water storage unit, to store water to be supplied to the fuel cell, that has a hot medium flow passage, circulating antifreeze solution to the fuel cell and the hot medium flow passage through an antifreeze circulation flow passage, and heating the antifreeze solution flowing through the antifreeze circulation flow passage for thereby heating the water in the water storage unit.

BEST MODE FOR CARRYING OUT THE INVENTION

Hereinafter, embodiments according to the present invention are described with reference to the attached drawings.

Figure 1:
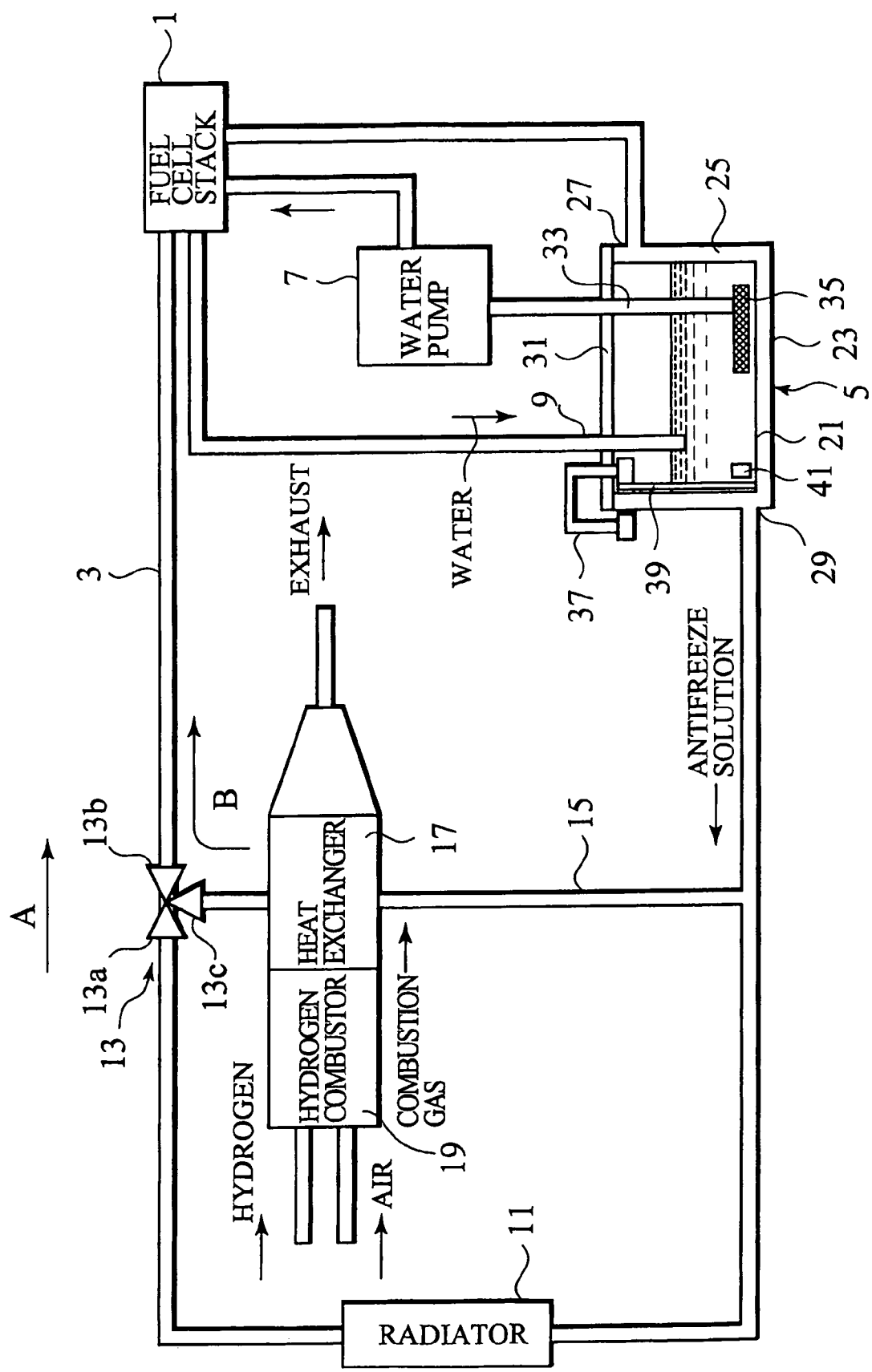
FIG. 1 is a system structural view of a fuel cell device of a first embodiment according to the present invention.

FIG. 1 is a system structural view of a fuel cell device illustrating a first embodiment according to the present invention. The fuel cell device, which is referred to here, is intended to be installed on a vehicle and includes an antifreeze circulation passage 3, that circulates antifreeze solution to cool a fuel cell stack 1, and a water tank 5 that serves as water storage means for storing water, to humidify air containing oxygen serving as oxidant to be supplied to the fuel cell stack 1 described above, or water to be mixed as steam with methanol to produce hydrogen in a structure equipped with a methanol reformer.

Water in the water tank 5 is drawn by a pump 7 and supplied to the fuel cell stack 1 for the purpose of humidifying the same as set forth above. Water expelled from the fuel cell stack 1 is returned to the water tank 5 through a return flow passage 9.

Antifreeze solution, whose temperature is increased after having cooled the fuel cell stack 1 in which heat builds up, is cooled in a radiator 11 and fed through a three-way valve 13 to the fuel cell stack 1.

Further, the antifreeze circulation passage 3 includes a heat-exchange bypass flow passage 15, that bypasses the radiator 11 and has one end connected to the three-way valve 13, in which a heat exchanger 17 is located which serves as an antifreeze heating means. The heat exchanger 17 is supplied with combustion gas generated in a hydrogen combustor 19 to heat antifreeze solution.

The hydrogen combustor 19 is supplied with hydrogen and air, which are combusted. The hydrogen results from hydrogen obtained in the methanol reformer stated above or hydrogen stored in a hydrogen tank, or excessive hydrogen expelled from the fuel cell stack 1. Also, use is made for air that comes from air, diverged from an air flow passage, to be supplied to the fuel cell stack 1.

Figure 2:
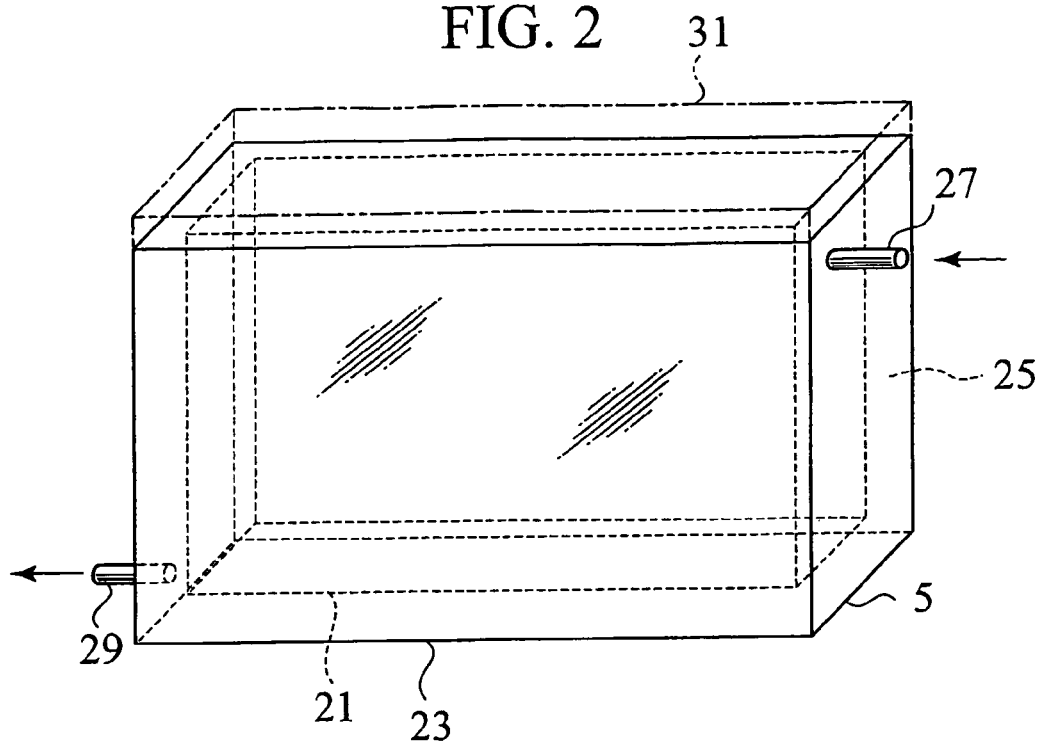
FIG. 2 is a perspective view of a water tank of the first embodiment
Figure 3:
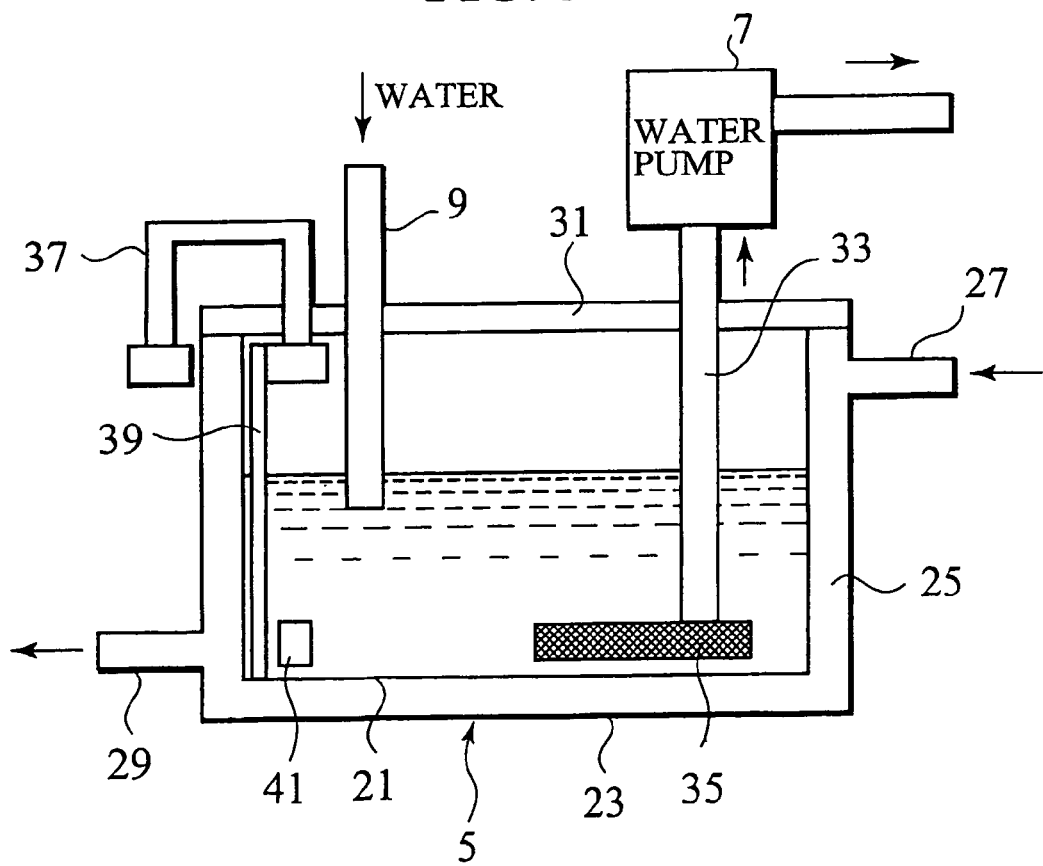
FIG. 3 is a cross sectional view of the water tank of the first embodiment.

As shown in FIG. 2 and FIG. 3, the water tank 5 takes the form of a double-layer structure comprised of an inside tank component 21, which serves as a water contact section, and an outside tank component 23, with a spacing defined between the inside tank component 21 and the outside tank component 23 to form a hot medium flow passage 25 to allow the above-described antifreeze solution to flow.

Disposed in an upper area of the water tank 5 at right side thereof in the figure is an antifreeze solution inlet 27 that allows antifreeze solution to be admitted to the hot medium flow passage 25 from the antifreeze circulation passage 3, and disposed in a lower area of the water tank 5 at left side thereof in the figure is an antifreeze solution outlet 29 that allows antifreeze solution prevailing in the hot medium flow passage 25 to be discharged into the antifreeze circulation passage 3.

The water tank 5 has a top portion that is formed with an opening portion, to which a lid 31 is mounted to cover the same. Connected to a lower end of the water pump 7 is a water suction conduit 33 that extends through the lid 31 and its distal end (lower end) reaches the vicinity of a bottom portion of the water tank 5 while carrying a strainer 35. Also, the return flow passage 9 extends through the lid 31 and has its distal end exposed to an inside of the water tank 5. Additionally, mounted on the water tank 5 are air bleeder 37 that suppresses increase in an internal pressure, a water level meter 39 that measures a water volume in the water tank 5, and a water temperature gauge 41 that serves as a temperature detection means for measuring the temperature of water in the water tank 5.

Also, in FIG. 2, the water pump 7 and air bleeder 37 mounted on the water tank 5 are omitted.

Now, operation of the fuel cell device of the presently filed embodiment is described.

During a normal traveling mode of a vehicle, the three-way valve 13 remains in a state to allow flow paths 13a, 13b to communicate one another and, hence, antifreeze solution flows through the fuel cell stack 1 and the radiator 11 so as to circulate through the antifreeze circulation passage 3 in a direction as shown by an arrow A. When this takes place, antifreeze solution absorbs heat from the fuel cell stack 1, whose temperature is raised during operation, and dissipates the same in the radiator 11, thereby adjusting the temperature of (cooling) the fuel cell stack 1.

During a cold start-up mode, the three-way valve 13 remains in a state to allow flow paths 13c, 13b to communicate one another and, hence, antifreeze solution flows through the fuel cell stack 1 and the heat exchanger 17 so as to circulate through the antifreeze circulation passage 3, involving the heat exchange bypass flow passage 15, in a direction as shown by an arrow B.

When this takes place, the hydrogen combustor 19 is supplied with hydrogen for combustion, with resulting combustion gas being used as heating medium of the heat exchanger 17 by which antifreeze solution is heated. Heated antifreeze solution then passes through the fuel cell stack 1 to heat the same whereupon heated antifreeze solution flows through the antifreeze solution inlet 27 of the water tank 5 to the hot medium flow passage 25.

Antifreeze solution, admitted to the hot medium flow passage 25, thaws ice, that is formed when water is condensed in the water tank 5, and, thereafter, flows out from the antifreeze solution outlet 29 to the antifreeze circulation passage 3 to be returned to the heat exchanger 17. As far as hydrogen is supplied to the hydrogen combustor 19, antifreeze solution is heated, with resulting heat medium heating the fuel cell stack 1 and the water tank 5.

Thawed water in the water tank 5 is drawn by the water pump 7 and used for heating the fuel cell stack 1. Also, combustion gas expelled from the heat exchanger 17 is exhausted to the outside of the vehicle.

Thus, according to the first embodiment set forth above, a heat value resulted in antifreeze solution heats ice (water) in the water tank 5 via the inside water tank component 21 which is held in contact with water inside the water tank 5, thereby enabling a thawing phase to be efficiently completed in a rapid fashion.

Further, due to the presence of the antifreeze solution inlet 27 located in the water tank 5 at an area higher than the antifreeze solution outlet 29, heat exchange takes place between water (ice), prevailing in an upper portion where temperature is relatively lower than that of a lower portion due to the existence of ice that is floating because of the small specific gravity during the thawing phase, and antifreeze solution prevailing closer to the antifreeze solution inlet 27 (with no drop in temperature) and, therefore, a temperature difference between two media relatively increases, resulting in a capability of efficiently and rapidly achieving the thawing phase.

Additionally, in such case, since the water tank 5 is heated using antifreeze solution, that is heated by the heat exchanger 17, for heating the fuel cell stack 1, no separate heating means, such as a heater, specific for heating the water tank 5 is required.

Figure 4:
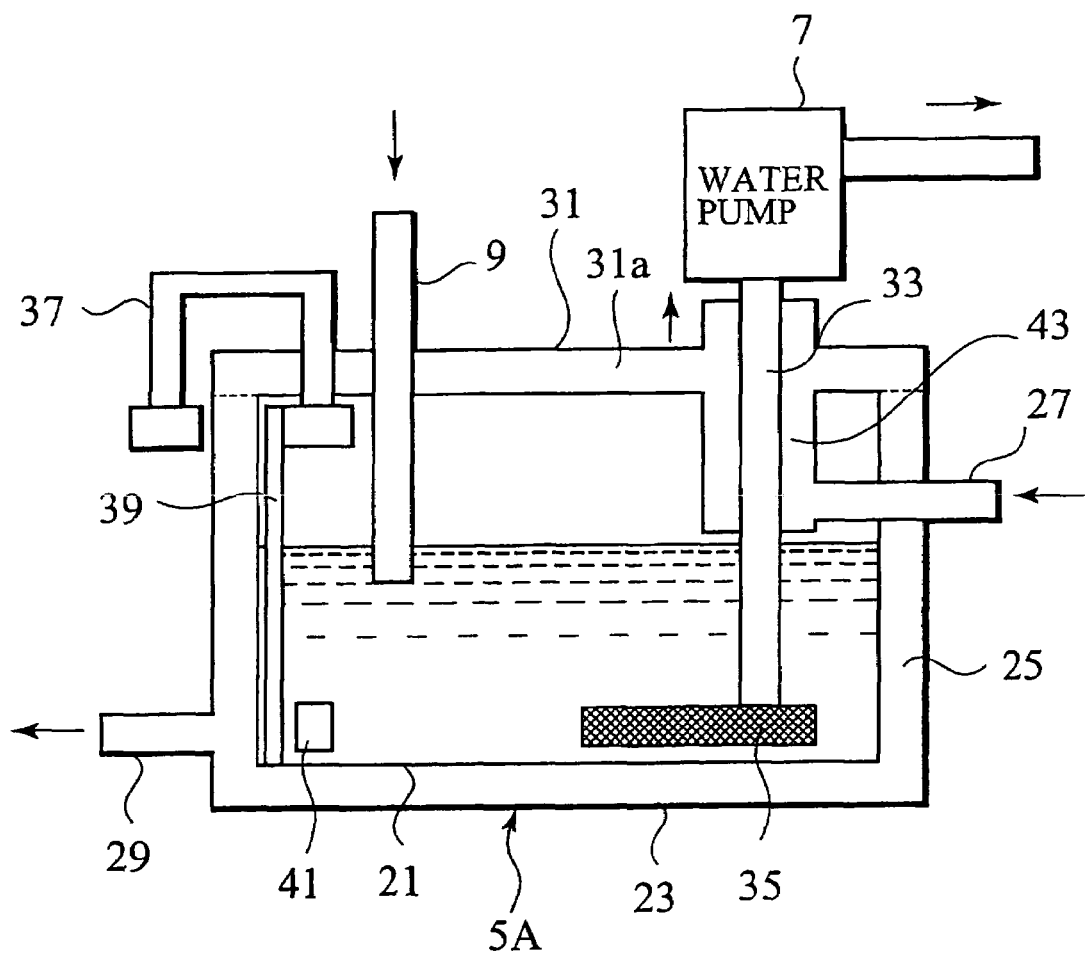
FIG. 4 is a cross sectional view of a water tank showing a second embodiment.

FIG. 4 is a cross sectional view of a water tank 5A illustrating a second embodiment of the present invention. Also, here, the same component parts as those of the first embodiment bear like reference numerals and only differing portions are described.

In the presently filed embodiment, a suction conduit heating section 43 through which antifreeze solution flows is located around a periphery of the water suction conduit 33 of the water pump 7. The suction conduit heating section 43 takes the form of a cylindrical shape and is so configured as to extend from an upper end portion of the water suction conduit 33 toward a substantially central area thereof in a vertical direction, with one end of the antifreeze solution inlet 27 being connected to the vicinity of a lower end of the suction conduit heating section 43. The other end of the antifreeze solution inlet 27 extends through the water tank 5A to be taken out to the outside of the water tank 5 and is connected to the antifreeze circulation passage 3 as shown in FIG. 1 as set forth above.

Further, here, the lid 31 is internally formed with a hot medium flow passage 31a, through which antifreeze solution flows, that is in communication with the hot medium flow passage 25 and the suction conduit heating section 43, respectively. That is, antifreeze solution flowing through the antifreeze circulation passage 3 shown in FIG. 1 flows to the suction conduit heating section 43 from the antifreeze solution inlet 27 and, subsequently, flows into the hot medium flow passage 25 through the hot medium flow passage 31a to reach the antifreeze solution outlet 29. Consequently, the lid 31 is placed on the upper opening of the water tank 5A to seal the upper opening watertight. Other structure is identical to that of the first embodiment.

According to the structure of the presently filed embodiment, heated antifreeze solution flows from the antifreeze solution inlet 27 into the suction conduit heating section 43 to heat water in the water suction conduit 33 and, thereafter, flows through the hot medium flow passage 25 between the inside water tank component 21 and the outer water tank component 23, thereby heating ice (water). When this takes place, since it is possible to heat water being drawn by the water pump 7, it is possible to prevent water from being frozen again in the water pump 7 where a high probability exists in the cold temperature condition below 0 C.

Figure 5:
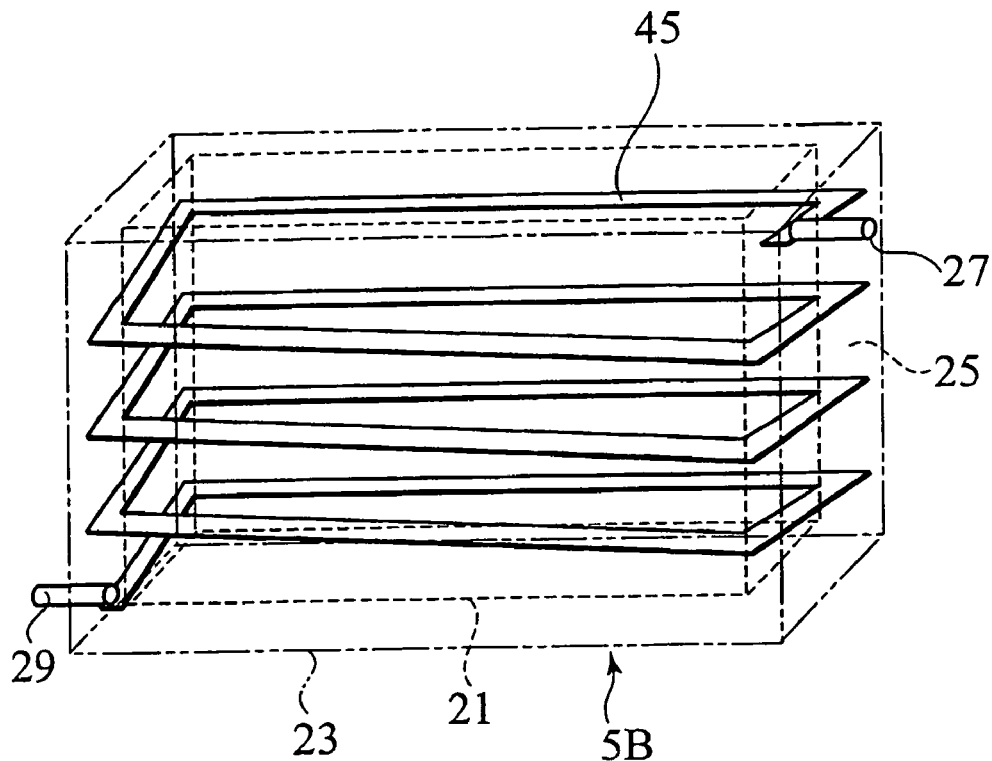
FIG. 5 is a perspective view of a water tank showing a third embodiment.
Figure 6:
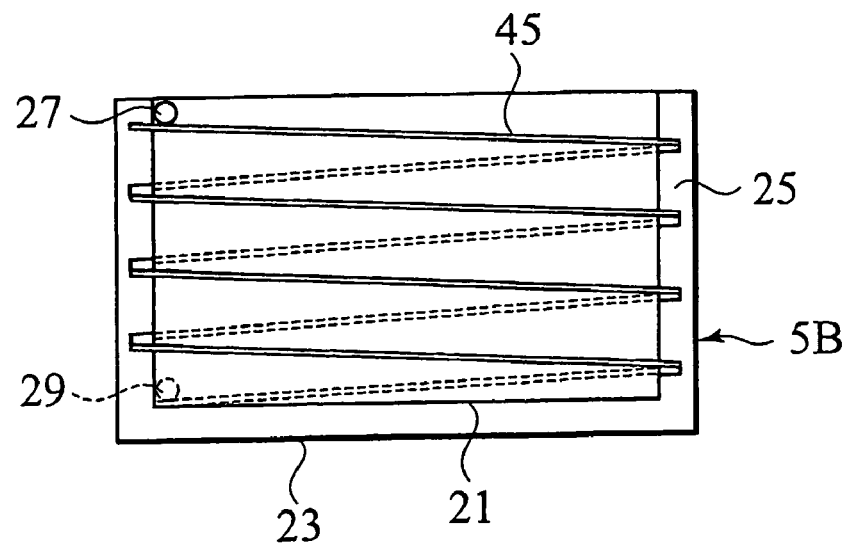
FIG. 6 is a cross sectional view, as viewed in a right direction in FIG. 5, illustrating a skeletal form of an internal structure of the water tank of the third embodiment.

FIG. 5 is a perspective view of a water tank 5B showing a third embodiment of the present invention. FIG. 6 is a cross sectional view of the water tank as viewed in a right direction in FIG. 5 to show an outline of an internal structure of such a water tank 5B. Also, although the water tank 5B takes the form of a double-layer structure equipped with the inside tank component 21 and the outside tank component 23 like in the first embodiment shown in FIG. 1, the component elements, such as the lid 31, the water pump 7 and the air bleeder 37, which are mounted in the water tank 5 are omitted in a simplified form, and the same component parts as those of the first embodiment bear the same reference numerals to describe only differing portions.

In the presently filed embodiment, a spiral shaped antifreeze rectification plate 45 is disposed in the hot medium flow passage 25 between the inside tank component 21 and the outer water tank component 23 to guide antifreeze solution to the antifreeze solution outlet 29 through the antifreeze solution inlet 27. The antifreeze rectification plate 45 has an inner periphery fixedly secured to an outer peripheral surface of the inside water tank component 21. Meanwhile, in order for an edge portion of an outer peripheral side of the antifreeze rectification plate 45 to have less heat transfer with the outside of the water tank 5B, the edge portion is out of contact with the inner periphery of the outside tank component 23 (see FIG. 6).

With the structure of the presently filed embodiment, antifreeze solution introduced from the antifreeze solution inlet 27 into the hot medium flow passage 25 flows along the antifreeze rectification plate 45 and flows out from the antifreeze solution outlet 29.

Accordingly, in such case, antifreeze solution substantially uniformly flows throughout an entire area of the hot medium flow passage 25 without depending upon the flow rate and temperature, enabling efficient heat exchange to take place.

Figure 7:
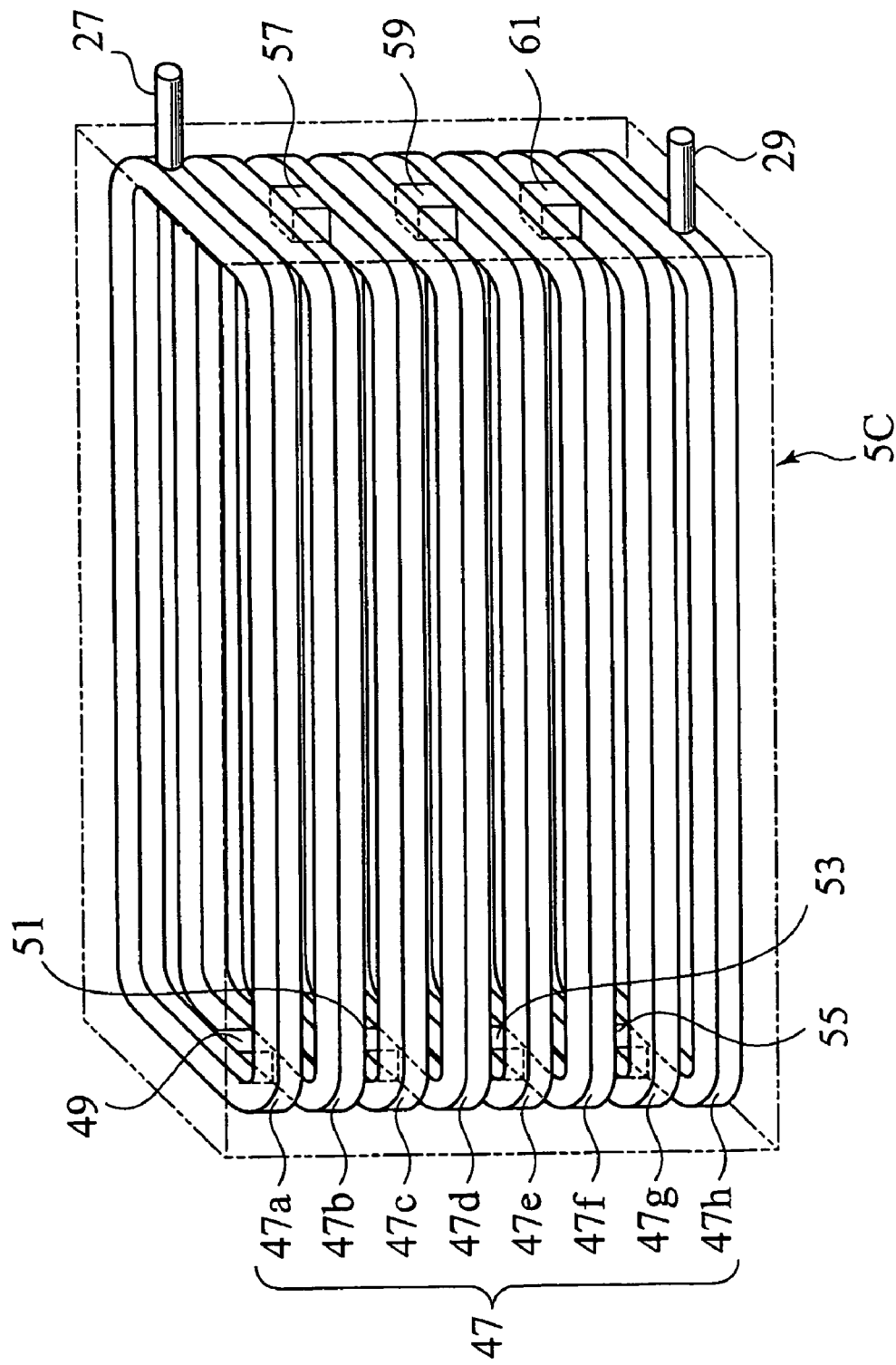
FIG. 7 is a perspective view illustrating an internal structure of a water tank showing a fourth embodiment.

FIG. 7 is a perspective view illustrating an internal structure of a water tank 5C of a fourth embodiment of the present invention. Also, here, the same component elements as those of the first embodiment set forth above bear the like reference numerals and differing portions are mainly described. Also, in FIG. 7, the component elements, such as the lid 31, the water pump 7 and the air bleeder 37, mounted in the water tank 5 are omitted.

In the presently filed embodiment, the water tank 5C has no double-layer structure, and a plurality of annular conduits 47 (conduit components 47a, 47b, 47c, . . . , 47g, 47h), forming a hot medium flow passage that is disposed in an annular configuration along an inner wall of the water tank 5C, are disposed in a stacked structure with a given distance prevailing in a vertical direction in the figure. Then, the antifreeze solution inlet 27 is connected to the uppermost annular conduit 47a, and the antifreeze solution outlet 29 is connected to the lowermost annular conduit 47h.

Here, the uppermost annular conduit 47a and an adjacent lower annular conduit 47b are connected at one side (on a left side wall in FIG. 7) of the water tank 5 opposite to the antifreeze solution inlet 27 and the antifreeze solution outlet 29 by means of a connecting conduit 49. In addition, the third and fourth annular conduits 47c, 47d are mutually connected by means of a connecting conduit 51, the fifth and sixth annular conduits 47e, 47f are mutually connected by means of a connecting conduit 53, and the seventh and eight annular conduits 47g, 47h are mutually connected by means of a connecting conduit 55, respectively, at the one side of the water tank 5 opposite to the antifreeze solution inlet 27 and the antifreeze solution outlet 29.

Further, the second and third annular conduits 47b, 47c, the fourth and fifth annular conduits 47d, 47e and the sixth and seventh annular conduits 47f, 47g are mutually connected by means of connecting conduits 57, 59, 61, respectively, on the other side of the water tank 5 at which the antifreeze solution inlet 27 and the antifreeze solution outlet 29 are located.

Thus, antifreeze solution, that enters from the antifreeze solution inlet 25 into the uppermost annular conduit 47a, flows through the annular conduit 47a leftward in the figure to enter from the connecting conduit 49 into the lower annular conduit 47b, from which antifreeze solution then flows rightward in the figure to enter from the connecting conduit 57 into the lower annular conduit 47c.

In such a way, antifreeze solution sequentially flows through the respective annular conduits 47, that are stacked up and down, and flows in a downward direction whereupon it finally flows out from the antifreeze solution outlet 29, that is connected to the lower most annular conduit 47h, to the outside. For this reason, with the presently filed embodiment, uniform flow of antifreeze solution can be obtained without depending upon the flow rate or the temperature thereof and a surface area between water (ice), forming a body to be heated, and the annular conduit 47 can be increased, enabling efficient heat-exchange.

Also, the annular conduit 47 of the presently filed embodiment does not need to be disposed in a substantially entire area of the water tank 5C along a vertical direction thereof, but may be disposed only in a lower area where water is received.

Further, in place of the annular conduits 47, a spiral shaped conduit may be provided which takes the form of a spiral configuration extending from an upper portion to a lower portion in the figure. In such case, no connecting conduits 49 to 61 are required. The presence of the flow passage formed in the spiral configuration to pass antifreeze solution provides a more simplified structure to be easily manufactured than that of the annular type, resulting in reduction cost.

Figure 8:
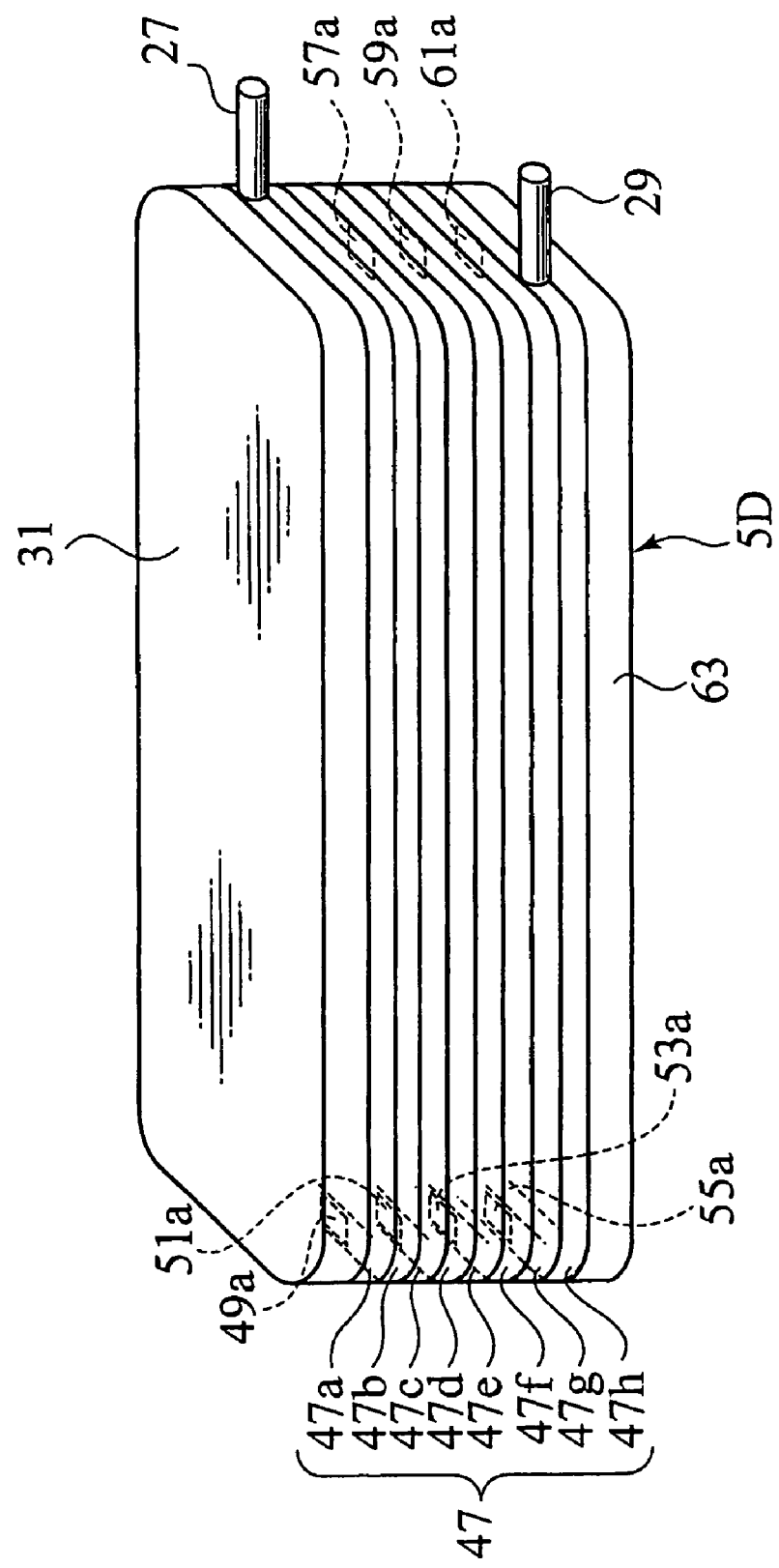
FIG. 8 is a perspective view illustrating an external structure of a water tank showing a fifth embodiment.

FIG. 8 is a perspective view illustrating an external structure of a water tank 5D of a fifth embodiment of the present invention. Also, here, the same component parts as those of the first embodiment bear the same reference numerals and reference is mainly made in only differing portions. Further, in FIG. 8, the component elements, such as the water pump 7 and the air bleeder 37, that are mounted in the water tank 5 are omitted.

The presently filed embodiment is configured to have a water tank 5D that has a side wall by which a hot medium flow passage is formed. The hot medium flow passage in this case is comprised of a plurality of annular conduits 47 (conduit components 47a, 47b, 47c, ... 47g, 47h) that have the same structures as those shown in FIG. 7, with mutually adjacent portions being mutually joined by brazing to be stacked in sealed watertight state.

Further, communication ports 49a to 61a, that allow the adjacent annular conduits 47 to mutually communicate one another, are formed in the annular conduits, respectively, at positions corresponding to the connecting conduits 49 to 61 of the embodiment shown in FIG. 7.

Accordingly, in the presently filed embodiment, antifreeze solution sequentially flows downward through the respective annular conduits 47 stacked up and down and flows out to the outside from the antifreeze solution outlet connected to the lowermost annular conduit 47h.

Furthermore, a lower portion of the lowermost annular conduit 47h is closed by brazing a tank bottom plate 63. Meanwhile, a lid 31 is joined to or detachably placed on an upper portion of the uppermost annular conduit 47a.

Consequently, in the presently filed embodiment, flow of antifreeze solution can be uniformed while constructing the side wall of the water tank 5D enables production in light weight.

Also, the annular conduits 47 in the fifth embodiment set forth above does not need to be disposed in the substantially entire area of the water tank 5D along the vertical direction thereof like in the fourth embodiment and may be disposed only in the lower area where water is received.

Figure 9:
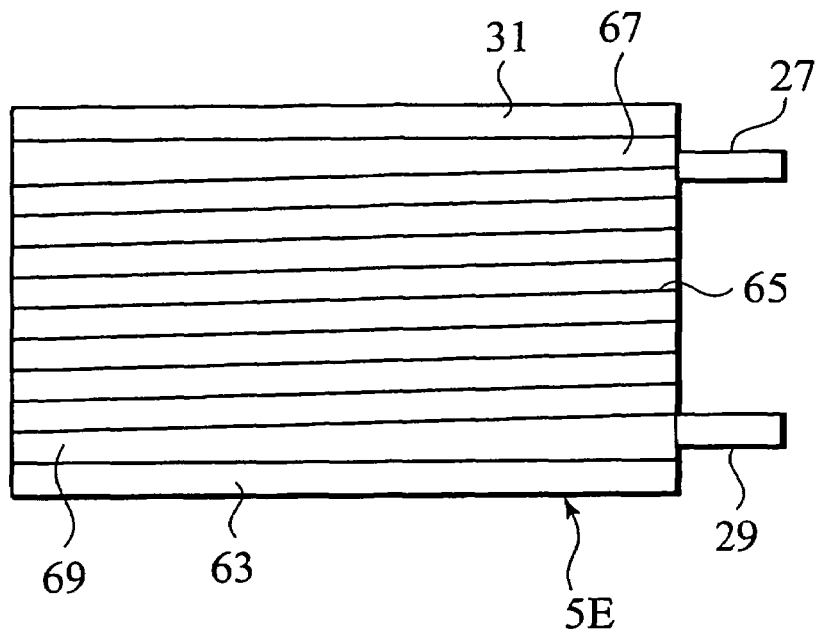
FIG. 9 is a front view illustrating an external structure of a water tank showing a sixth embodiment.
Figure 10:
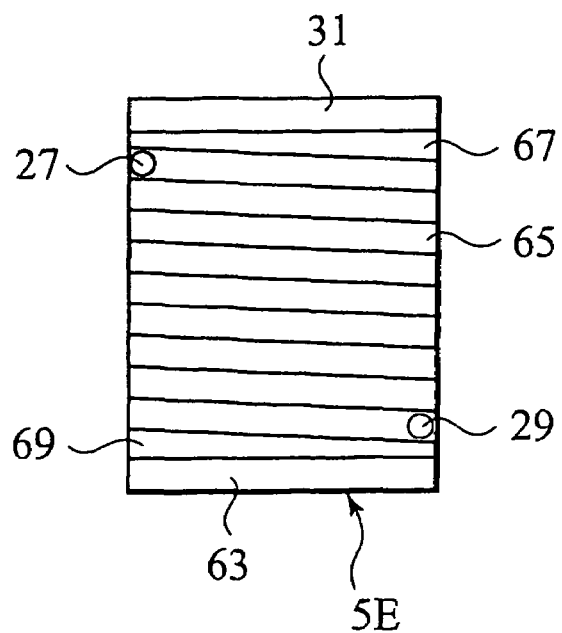
FIG. 10 is a right side view of the water tank shown in FIG. 9.

FIG. 9 is a front view illustrating an external structure of a water tank 5D showing a sixth embodiment of the present invention, and FIG. 10 is a right side view of FIG. 9. Also, here, the same component elements as those of the first embodiment bear the like reference numerals and reference is mainly made only in differing portions. Further, in FIGS. 9 and 10, the component elements, such as the water pump 7 and the air bleeder 37, that are mounted in the water tank 5 are omitted.

In the presently filed embodiment, in place of the annular conduits 47 of the fifth embodiment shown in FIG. 8 set forth above, a spiral shaped conduit 65 is provided which serves as a hot medium flow passage formed in a spiral configuration extending from an upper portion to a lower portion in the figure. In such case, mutually adjacent portions facing up and down of the spiral-shaped conduit 65 is sealed watertight, and no communication ports 49a to 61a shown in FIG. 8 are required.

Disposed between the uppermost end of the spiral shaped conduit 65 and the lid 31 is a lid joint member 67, for jointing or detachably mounting the lid 31, that is joined in a watertight condition. Also, disposed between the lowermost end of the spiral shaped conduit 65 and the tank bottom plate 63 is a lid joint member 69, for jointing or detachably mounting the tank bottom plate 63, that is joined in a watertight condition. The antifreeze solution inlet 27 is connected to the uppermost end of the spiral shaped conduit 65, and the antifreeze solution outlet 29 is connected to the lowermost end of the spiral shaped conduit 65.

Accordingly, in the presently filed embodiment, the presence of the hot medium flow passage formed in the spiral shape allows a structure to be further simplified to provide an ease of manufacturing than that of the case configured in the annular shape shown in FIG. 8, achieving reduction in cost.

Figure 11:
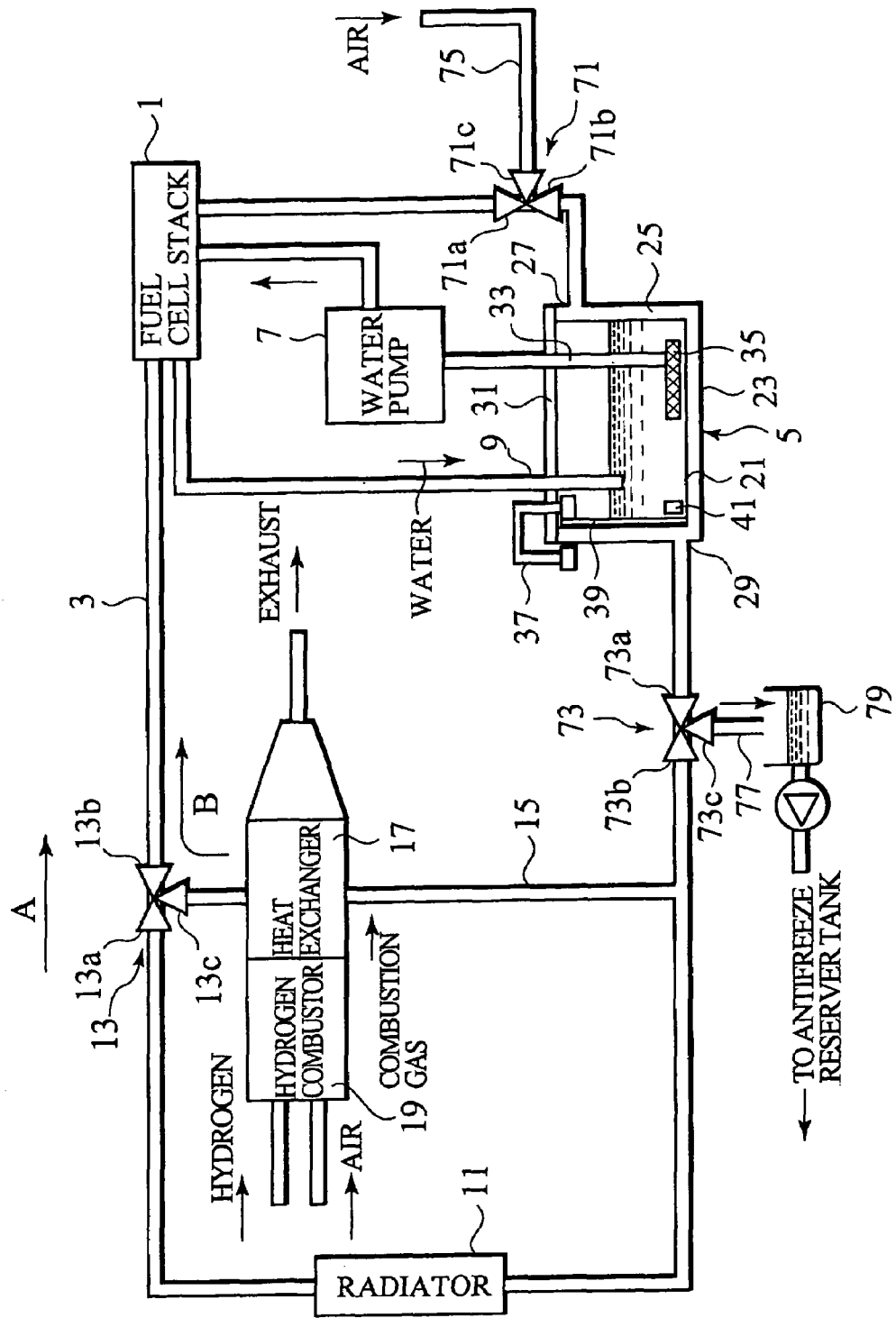
FIG. 11 is a system structural view of a fuel cell device of a seventh embodiment according to the present invention.

FIG. 11 is a system structural view of a fuel cell device illustrating a seventh embodiment of the present invention. Also, here, the same component elements as those of the first embodiment bear the same reference numerals and reference is mainly made only in differing portions.

In the presently filed embodiment, antifreeze solution is discharged from the hot medium flow passage 25 of the water tank 5, and exhausted antifreeze solution is replaced with air that flows through the hot medium flow passage 25.

As a system structure, in addition to the structure shown in FIG. 1 set forth above, three-way valves 71, 73 serving as hot medium switch-over means are disposed in the antifreeze solution flow passage 3 at upstream and downstream sides of the hot medium flow passage 25 of the water tank 5, respectively.

Connected to the three-way valve 71 upstream of the water tank 5 is an air flow supply passage 75 through which air branched off from a flow path of air stream to be supplied to the fuel cell stack 1 is admitted, and connected to the three-way valve 73 downstream of the water tank 5 is one end of an antifreeze solution discharge flow passage 77. The other end of the antifreeze solution discharge flow passage 77 is opened to an antifreeze drain tank 79 that serves as an antifreeze recovery means to allow antifreeze solution, expelled from the antifreeze drain tank 79, to be returned thereto.

Next, operation of the fuel cell device of the presently filed embodiment during switch-over of antifreeze solution is described.

Figure 12:
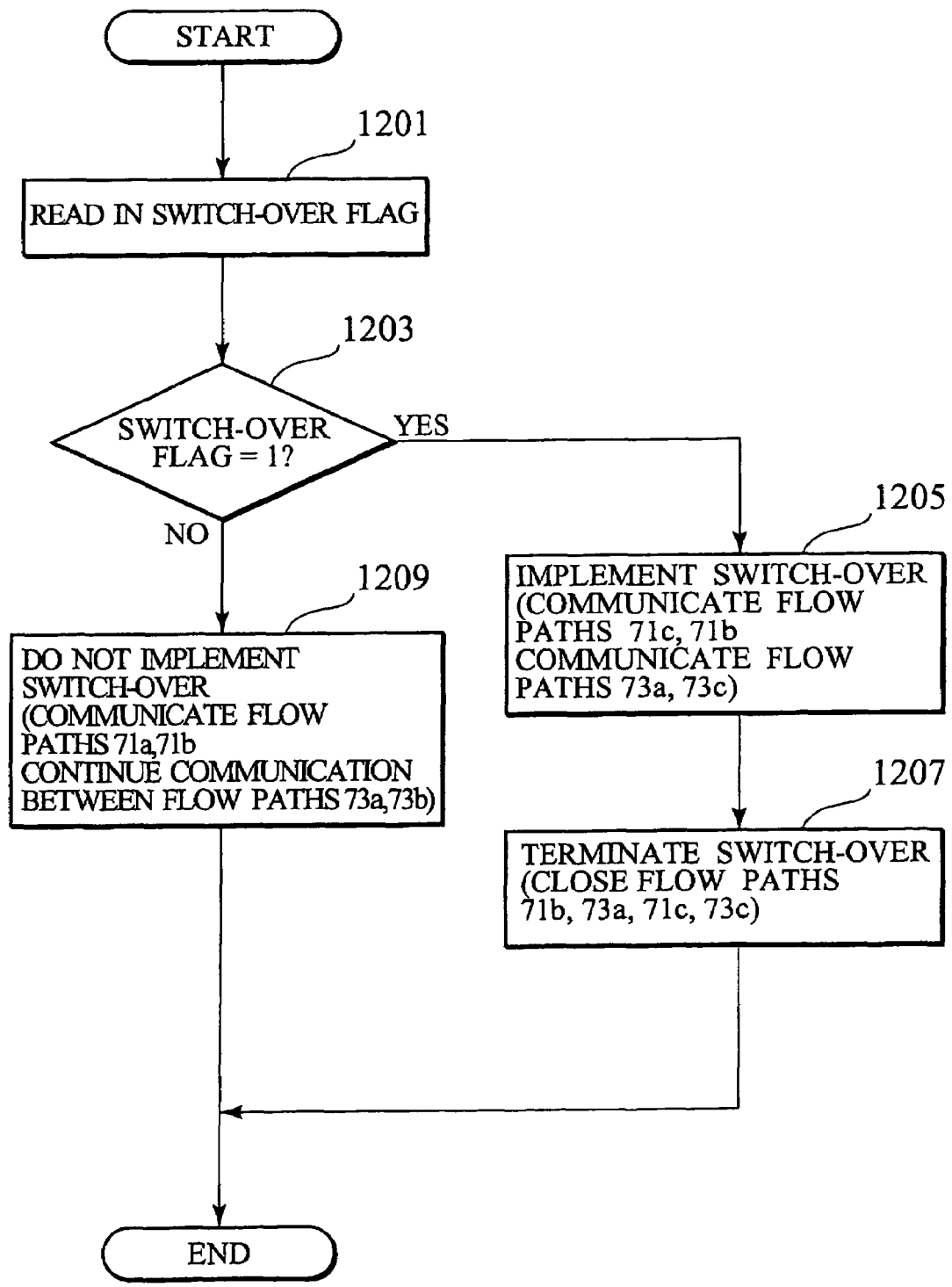
FIG. 12 is a flowchart illustrating a basic sequence of operations, to be performed during switch-over of antifreeze solution, of the seventh embodiment.

During switch-over of antifreeze solution, a situation wherein a flow path 71a and a flow path 71b of the three-way valve 71 communicate one another and a flow path 73a and a flow path 73b of the three-way valve 73 communicate one another is treated as an initial condition, and flow is proceeded in accordance with a flowchart of FIG. 12.

That is, first, operation is implemented to read in switch-over flags (FLG) "1" and "0" indicative of switch-over to be carried out and switch-over not to be carried out, respectively (step 1201). Next, judgment is made to find switch-over FLG=1 (step 1203) and, if switch-over FLG=1, the flow paths 71c, 71b of the three-way valve 71 communicate one another while the flow paths 73a, 73c of the three-way valve 73 communicate one another (step 1205). This allows air to be introduced from the supply flow passage 75 to the hot medium flow passage 25, with introduced air stream causing antifreeze solution to be expelled from the hot medium flow passage 25 the antifreeze drain tank 79 for air purging.

After a sufficient time period has elapsed for recovering antifreeze solution to the antifreeze drain tank 79, the respective flow paths 71b, 73a and the respective flow paths 71c, 73c are closed to seal air introduced into the hot medium flow passage 25 (step 1207). This antifreeze solution recovery time interval is appropriately determined based on experimental tests. If switch-over FLG≠1, the above-described initial states of the respective three-way valves 71, 73 are continued (step 1209).

This results in a capability of switching hot medium over from antifreeze solution to air with no disposal of antifreeze solution and, thus, if antifreeze solution includes 50% ethylene glycol aqueous solution, since a heat conductive rate is approximately 0.43 W/m/K whereas air has a heat conductive rate of approximately 0.024 W/m/K, a heat insulation property of the water tank 5 can be highly improved.

Figure 18:
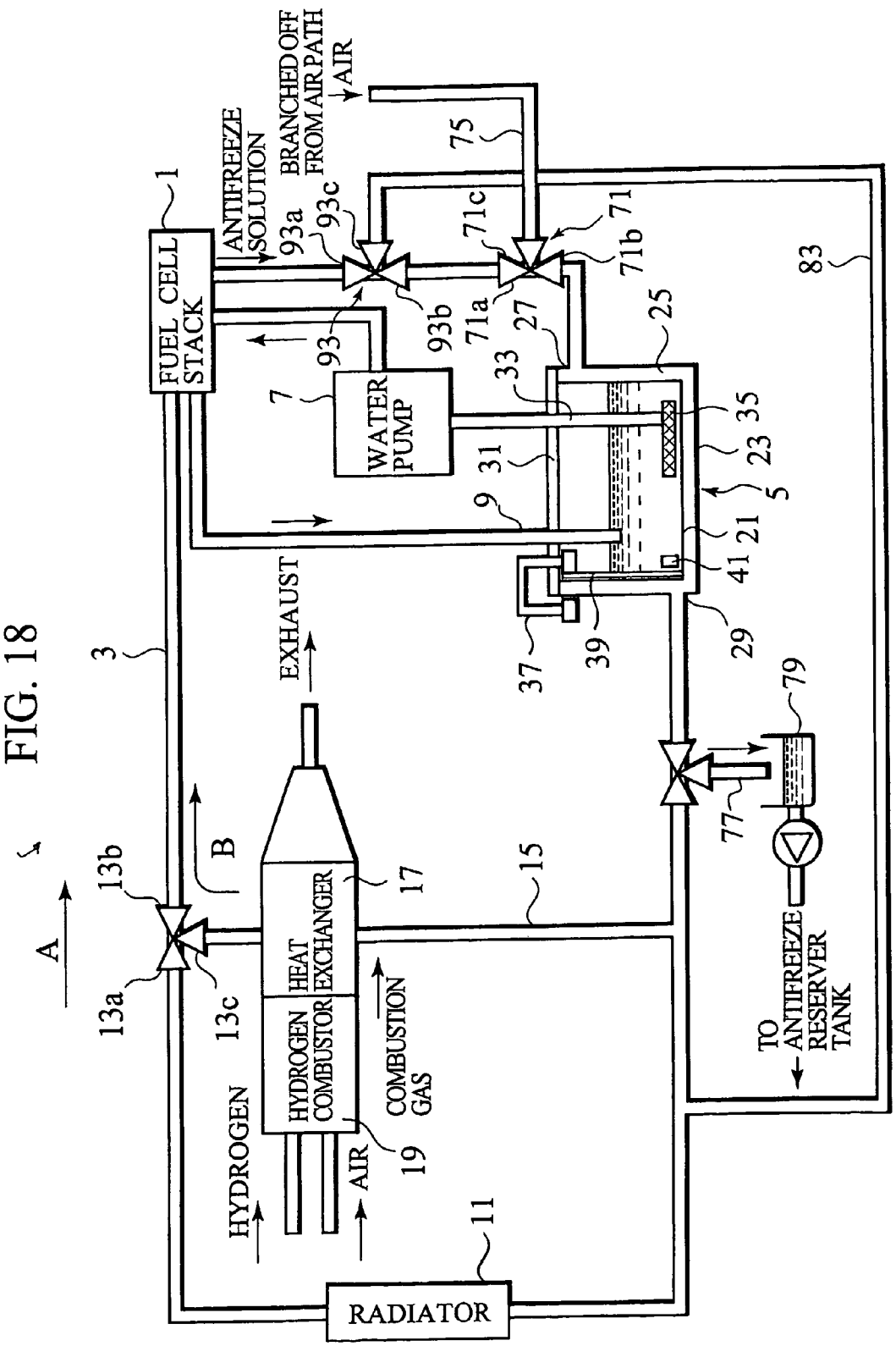
FIG. 18 is a system structural view of a fuel cell device showing an eleventh embodiment according to the present invention.

Also, in this case, as shown in FIG. 18 which will be described later, due to provision of a bypass flow passage 83 that allows the upstream antifreeze circulation flow passage 3 of the three-way valve 71 and the antifreeze circulation flow passage 3 closer to the radiator 11 downstream of the three-way valve 73, even if air is sealed in the hot medium flow passage 25, it becomes possible to circulate antifreeze solution for cooling the fuel cell stack 1.

Further, while the presently filed embodiment has been described with reference to the water tank 5 that has the structure to which the structure of the first embodiment is applied, the structure of the first embodiment may also be applied to the water tanks 5 of the fourth embodiment shown in FIG. 7, the fifth embodiment shown in FIG. 8 and the six embodiment shown in FIG. 10 such that the respective embodiments have the following features.

In the first embodiment, due to the presence of the water tank 5 formed in the double-layer structure, a significant advantage results in avoiding water from frozen. Especially, when use is made in a district where less frequency occurs in the ambient temperature dropping below freezing temperature, introducing air into the hot medium flow passage 25 allows a priority to be particularly given for a merit of preventing water from icing to permit water to be smoothly supplied during clod start-up.

In the fourth embodiment, due to the existence of the structure wherein the hot medium flow passage (composed of the annular conduits 47) is piped in the inner wall of the water tank 5, the peripheries of the annular conduits 47 are surrounded by water, resulting in an advantageous effect of efficiently achieving heat-exchange. That is, in a particular area, such as an extremely cold place (wherein no anti-freezing effect due to introduction of air is effectuated), where freezing frequently takes place, giving a top priority to thawing particularly enables heat-exchange to be efficiently performed, resulting in smooth operation to supply water during cold start-up.

In the fifth and six embodiments, due to the presence of the structure wherein the hot medium flow passage (comprised of the annular conduits 47 or the spiral shaped conduit 65) forms the side wall of the water tank 5, heat insulation effect is highly improved to enable efficient heat-exchange, thereby providing a compromise between block in freezing of water and efficient heat-exchange to some extent. If use is made in an intermediate district between an area to which the first embodiment is applied and another area to which the fourth embodiment is applied, the compromise between the effect of preventing water from being frozen and the effect in which efficient heat-exchange takes place is exhibited to some extent, thereby enabling water to be smoothly supplied during cold start-up.

Figure 13:
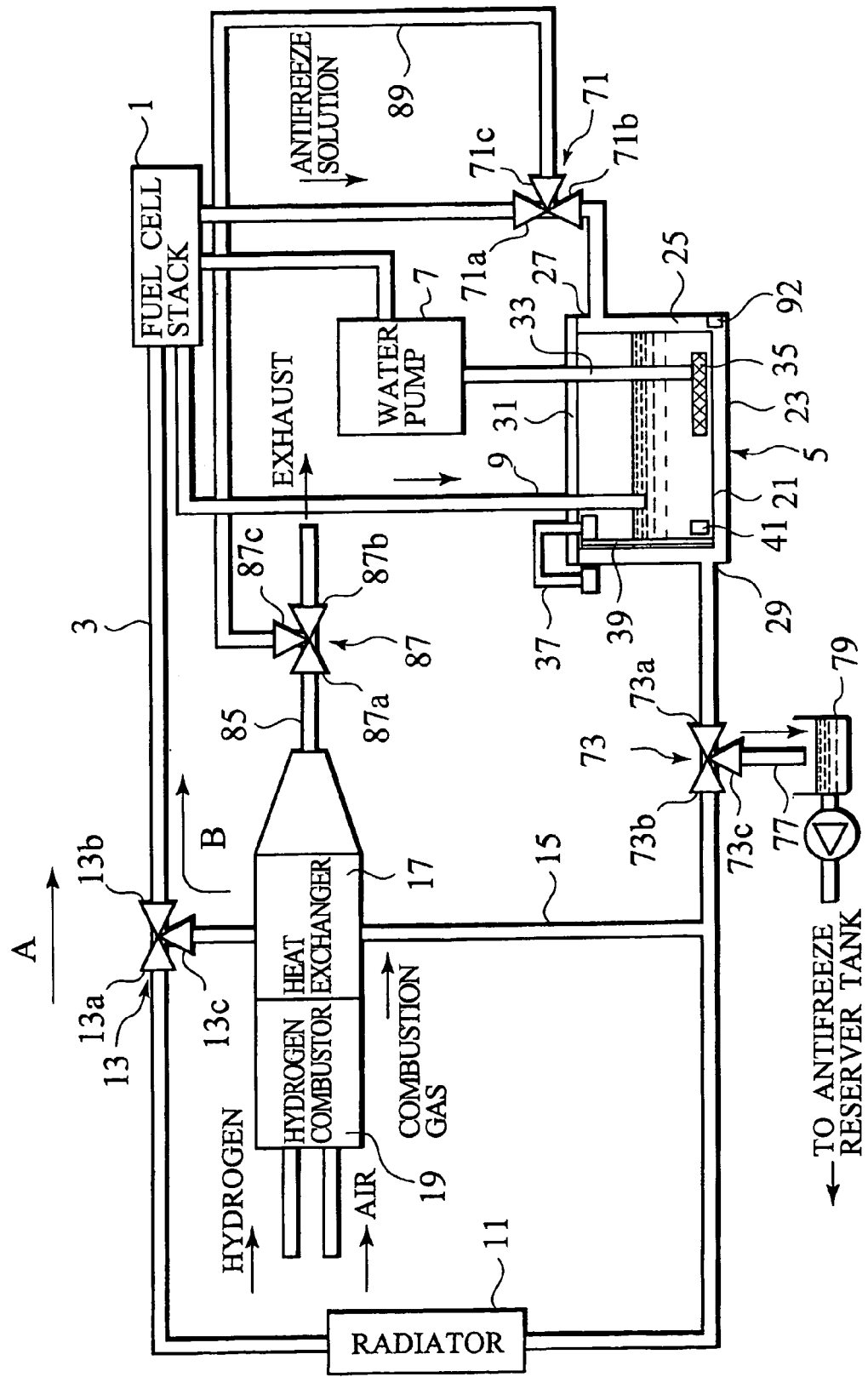
FIG. 13 is a system structural view of a fuel cell device showing an eighth embodiment according to the present invention.

FIG. 13 is a system structural view of a fuel cell device illustrating an eighth embodiment of the present invention. The presently filed embodiment contemplates to introduce combustion gas, expelled from the hydrogen combustor 19 through the heat exchanger 17, into the hot medium flow passage 25 in place of air to be introduced to the hot medium flow passage 25 of the fourth embodiment shown in FIG. 11 set forth above. Other structures are similar to those of the seventh embodiment.

That is, a three-way valve 87 is disposed in an exhaust gas exhaust flow passage 85 connected to the heat exchanger 17, with the three-way valve 87 and the three-way valve 71 disposed in the antifreeze circulation flow passage 3 disposed upstream of the water tank 5 being connected to one another by means of a combustion gas supply flow passage 89.

Now, operation of the fuel cell device of the presently filed embodiment during switch-over of antifreeze solution is described.

Figure 14:
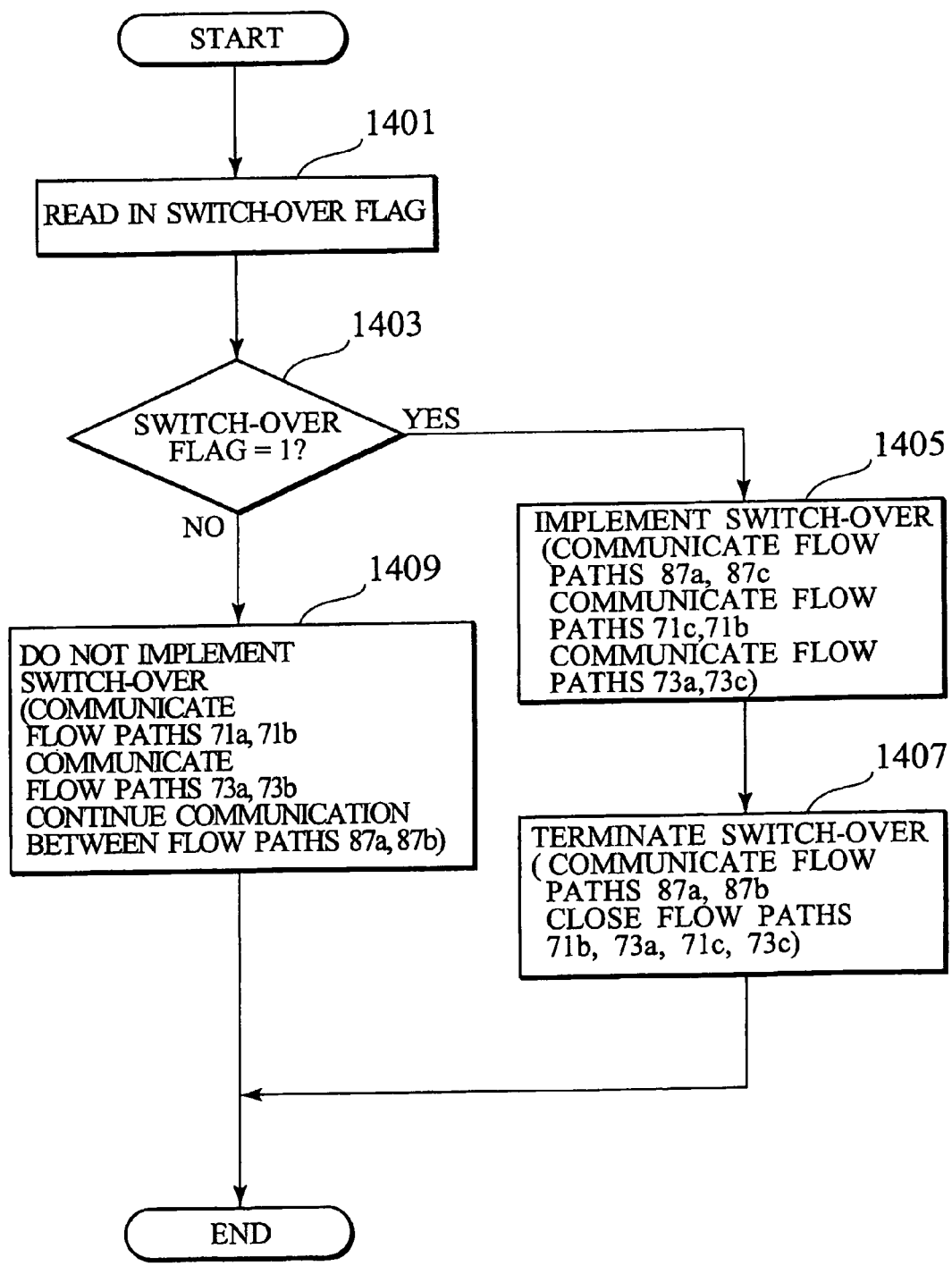
FIG. 14 is a flowchart illustrating a basic sequence of operations, to be performed during switch-over of antifreeze solution, of the eighth embodiment.

During switch-over of antifreeze solution, a situation wherein a flow path 87a and a flow path 87b of the three-way valve 87 communicate one another and the flow path 71a and the flow path 71b of the three-way valve 71 communicate one another while, further, the flow path 73a and the flow path 73b of the three-way valve 73 communicate one another is treated as an initial condition, and flow is proceeded in accordance with a flowchart of FIG. 14.

That is, first, operation is implemented to read in switch-over flags (FLG) "1" and "0" indicative of switch-over to be carried out and switch-over not to be carried out, respectively (step 1401). Next, judgment is made to find whether switch-over FLG=1 (step 1403) and, if switch-over FLG=1, the flow paths 87a, 87c of the three-way valve 87 communicate one another while the flow paths 71c, 71b of the three-way valve 71 communicate one another and, further, the flow paths 73a, 73c of the three-way valve 73 communicate one another (step 1405).

This allows combustion gas to be admitted to the hot medium flow passage 25 through the combustion gas supply flow passage 89 to expel antifreeze solution from the hot medium flow passage 25 to the antifreeze drain tank 79 for gas purging.

After a sufficient time period has elapsed for recovering antifreeze solution to the antifreeze drain tank 79, the respective flow paths 87a, 87b communicates one another while the respective flow paths 71b, 73a and the respective flow paths 71c, 73c are closed, respectively, to seal combustion gas introduced into the hot medium flow passage 25 (step 1407). This antifreeze solution recovery time interval is appropriately determined based on experimental tests. If switch-over FLG≠1, the above-described initial states of the respective three-way valves 71, 73, 87 are continued (step 1409).

Consequently, with the presently filed embodiment, due to an ability of high temperature combustion gas being introduced into and sealed in the hot medium flow passage 25, as the temperature of the sealed combustion gas drops, pressure reduction occurs in the hot medium flow passage 25, enabling the water tank 5 to have a highly improved heat insulation property.

Figure 15:
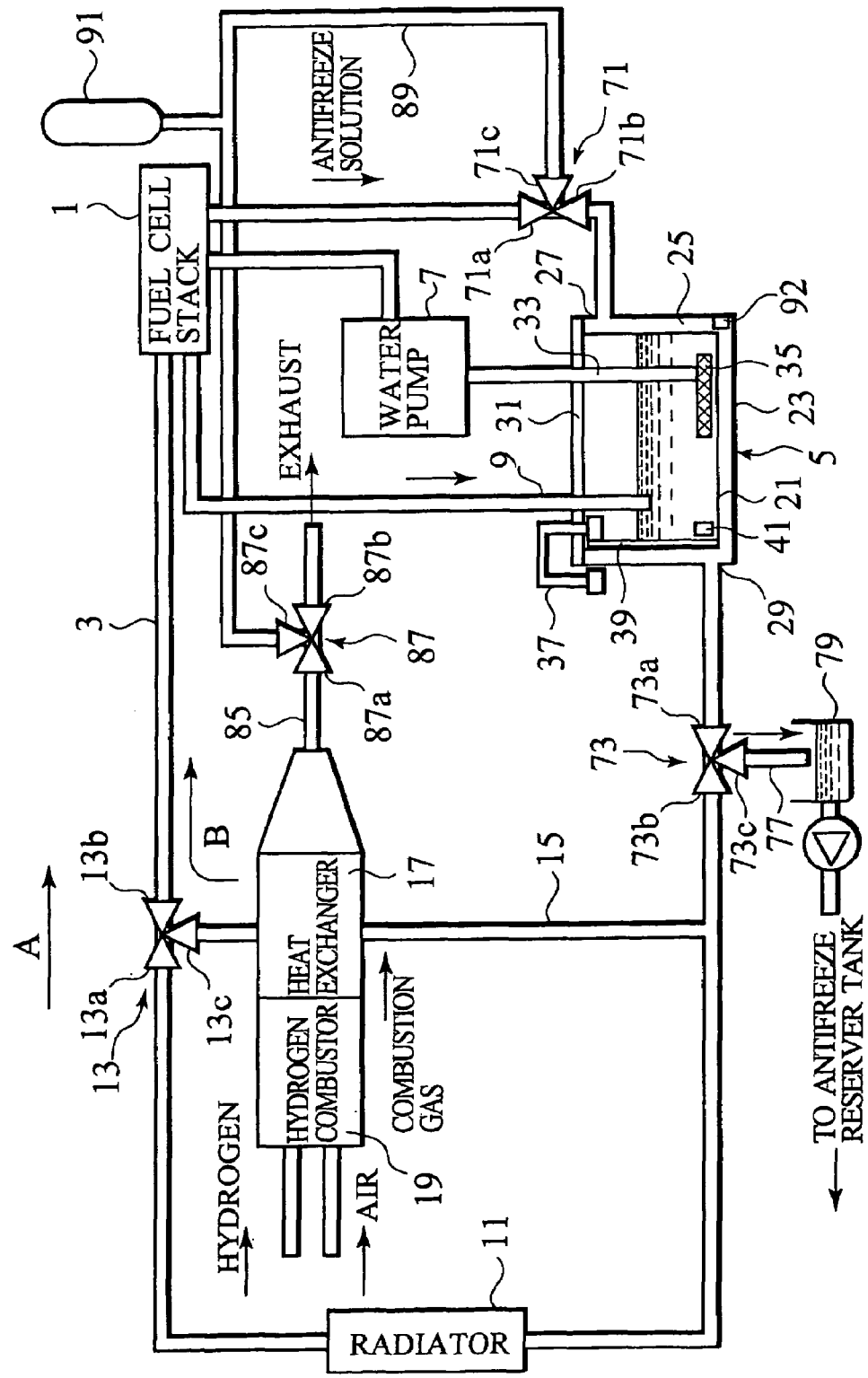
FIG. 15 is a system structural view of a fuel cell device of a ninth embodiment according to the present invention.

FIG. 15 is a system structural view of a fuel cell device illustrating a ninth embodiment of the present invention. The presently filed embodiment contemplates to incorporate an air tank 91, serving as an air storage means, that stores combustion gas, into the combustion gas flow passage 89 in the structure of the eighth embodiment shown in FIG. 13 set forth above. Other structures are similar to those of the eighth embodiment.

When storing combustion gas in the air tank 91, the flow path 87a and the flow path 87c of the three-way valve 87 communicate one another and the flow path 71c of the three-way valve 71 is closed. Under such condition, combustion gas generated in the hydrogen combustor 19 passes through the combustion gas exhaust passage 85 and the combustion gas supply flow passage 89 from the heat exchanger 17 and stored in the air tank 91.

Figure 16:
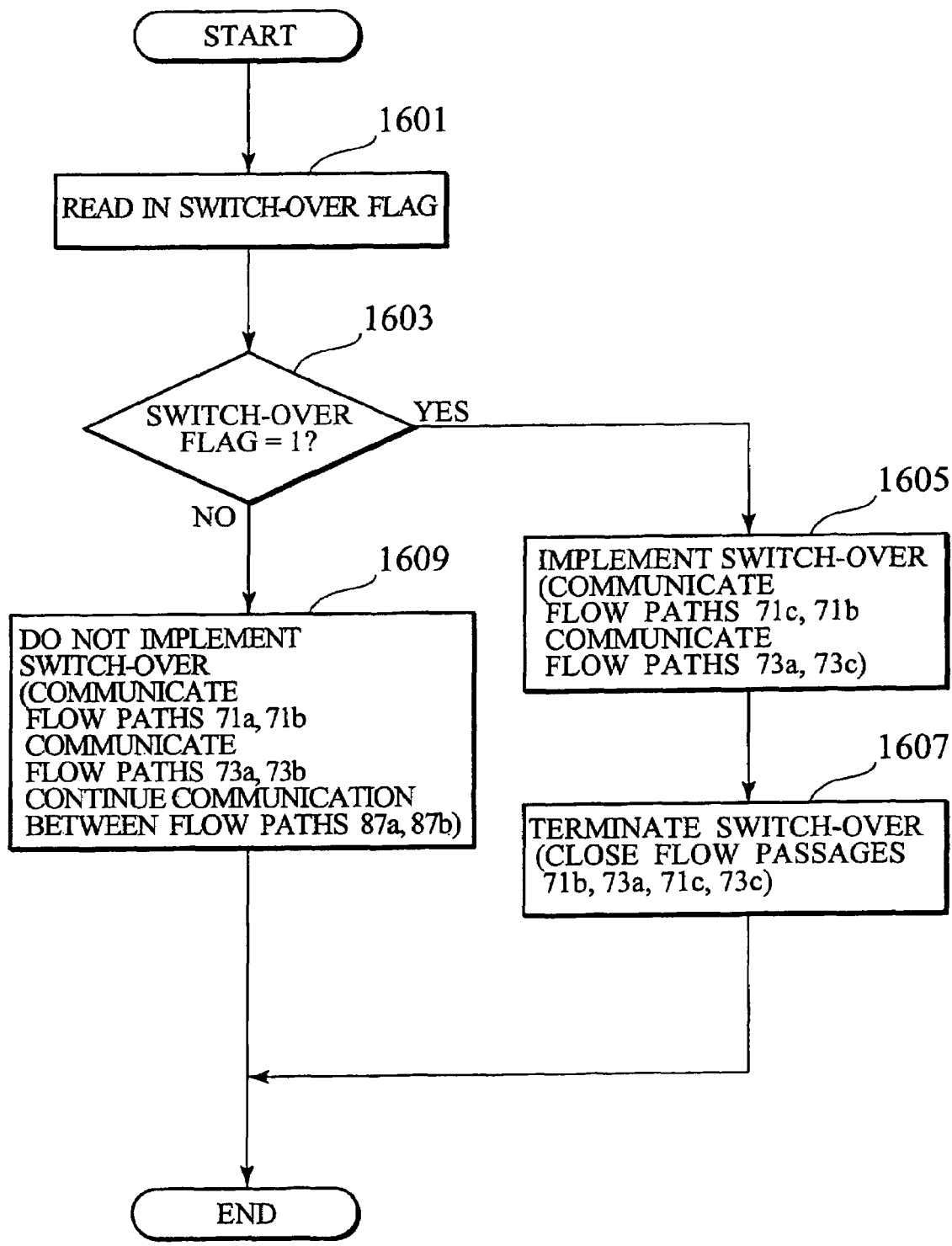
FIG. 16 is a flowchart illustrating a basic sequence of operations, to be performed during switch-over of antifreeze solution, of the ninth embodiment.

During switch-over of antifreeze solution, a situation wherein the flow path 87a and the flow path 87b of the three-way valve 87 communicate one another (with the flow path 87c being closed) and the flow path 71a and the flow path 71b of the three-way valve 71 communicate one another while, further, the flow path 73a and the flow path 73b of the three-way valve 73 communicate one another is treated as an initial condition, and flow is proceeded in accordance with a flowchart of FIG. 16.

That is, first, operation is implemented to read in switch-over flags (FLG) "1" and "0" indicative of switch-over to be carried out and switch-over not to be carried out, respectively (step 1601). Next, judgment is made to find whether switch-over FLG=1 (step 1603) and, if switch-over FLG=1, the flow paths 71c, 71b of the three-way valve 71 communicate one another while the flow paths 73a, 73c of the three-way valve 73 communicate one another (step 1605).

This allows combustion gas in the air tank 91 to be introduced into the hot medium flow passage 25 through the combustion gas supply flow passage 89 and the three-way valve 71 to expel antifreeze solution from the hot medium flow passage 25 to purge antifreeze solution into the drain tank 79.

After a sufficient time period has elapsed for recovering antifreeze solution to the antifreeze drain tank 79, the respective flow paths 71b, 73a and the respective flow paths 71c, 73c are closed to seal introduced combustion gas in the hot medium flow passage 25 (step 1607). This antifreeze solution recovery time interval is appropriately determined based on experimental tests. If switch-over FLG≠1, the above-described initial states of the respective three-way valves 71, 73, 87 are continued (step 1609).

Consequently, with the presently filed embodiment, even if the fuel cell electric generation system remains in a halt condition, antifreeze solution in the hot medium flow passage 25 of the water tank 3 can be replaced with combustion gas by using combustion gas stored in the air tank 91, enabling the water tank 5 to have a highly improved heat insulation property.

Also, the structure in which the air tank 91 is provided can be applied to the seventh embodiment of FIG. 11 set forth above. That is, in such case, the air tank 91 is disposed in the air supply flow passage 75 shown in FIG. 11 and the three-way valve may be disposed in the supply flow passage upstream of the air tank 91 for storing air in the air tank 91.

Figure 17:
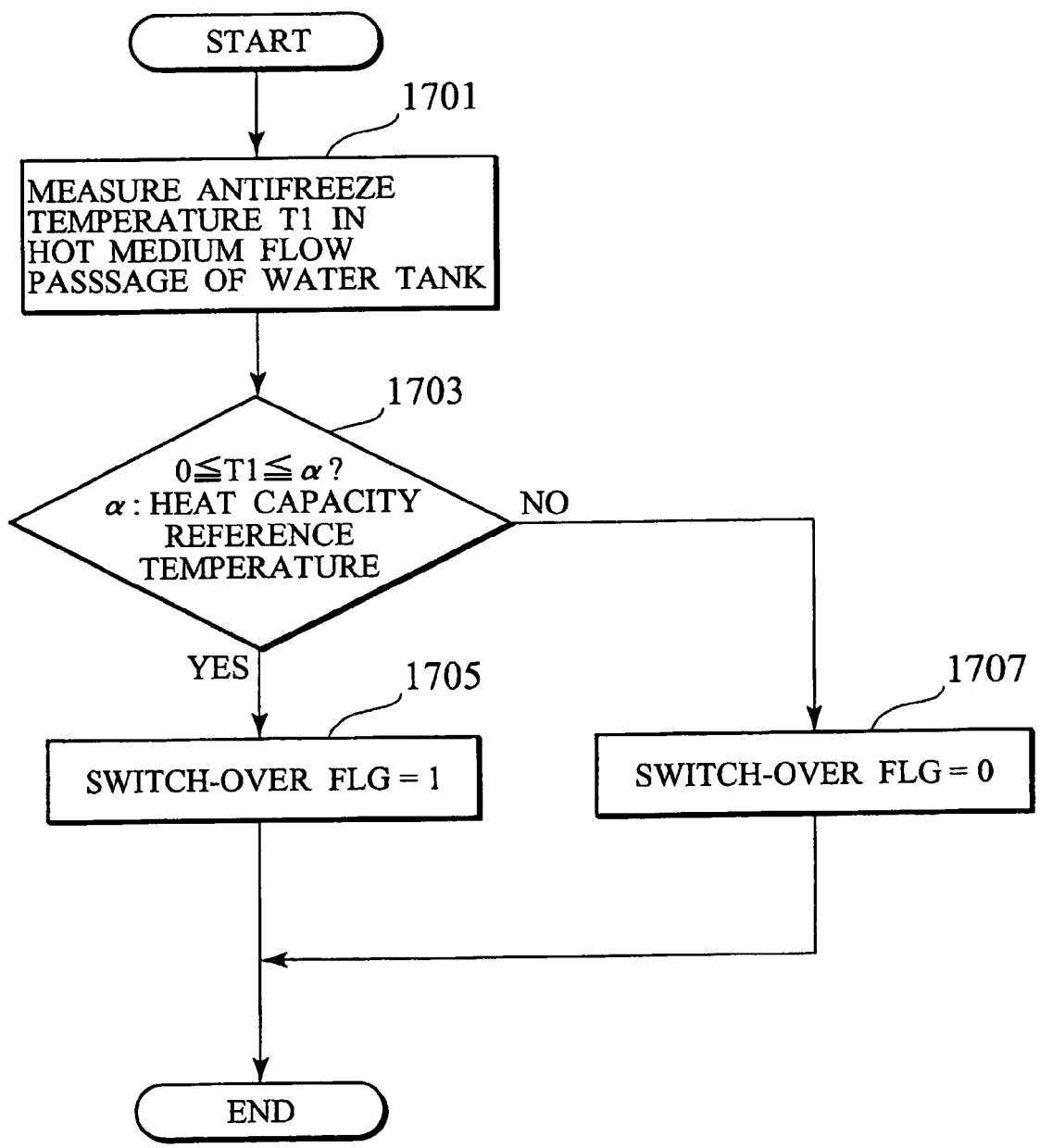
FIG. 17 is a flowchart, illustrating how a switch-over flag is determined during switch-over of antifreeze solution, that shows a tenth embodiment according to the present invention.

FIG. 17 is related to a tenth embodiment of the present invention and shows a flowchart for setting the switch-over flag for use in antifreeze switch-over in the seventh embodiment (FIGS. 11, 12), the eighth embodiment (FIGS. 13, 14) and the ninth embodiment (FIGS. 15, 16).

First, the antifreeze temperature T1 of the hot medium flow passage 25 in the water tank 5 is measured by an antifreeze temperature gage 92 serving as a temperature detection means (step 1701). Next, the antifreeze temperature T1 is compared with 0 C and αC (step 1703). Here, α designates a temperature with which reference is made for the heat capacity of antifreeze solution to act on block of freezing of water in the water tank 5.

Stated another way, since air has less coefficient of thermal conductivity than antifreeze solution, even at the same temperature of 0 C, air is harder to be cooled than antifreeze solution and, so, there is a probability in which it is preferable for antifreeze solution to be replaced with air at a timing with antifreeze solution remaining at a high temperature above 0 C to enable water to be avoided from being frozen in the water tank 5 as a whole. Thus, an upper limit of the high temperature above 0 C is determined as αC.

In the above step 1703, if $0 \leq T1 \leq \alpha$, it is supposed for switch-over FLG=1 (step 1705). If a situation does not stand for $0 \leq T1 \leq \alpha$, it is supposed for switch-over FLG=0 (step 1707). Since α varies in dependence upon the atmospheric temperature and the heat dissipating condition of the water tank 5, it is possible to employ a method wherein this value may be clear from experimental tests for each condition as data base for control in terms of parameters of the atmospheric temperature and the heat dissipating condition.

In response to this switch-over FLG, operation is executed to switch antifreeze solution, in the hot medium flow passage 25 in the water tank 5, over to air as shown in the seventh, eighth and ninth embodiments.

Replacing antifreeze solution inside the hot medium flow passage 25 with air in such a way allows the heat capacity of antifreeze solution to be used to its maximum while preventing waste of an operating performance of the fuel cell electric power generation system (to improve an efficiency), and combining this advantage with heat insulating action of air enables water in the water tank 5 from being efficiently prevented from being frozen.

FIG. 18 is a system structural view of a fuel cell device illustrating an eleventh embodiment of the present invention. The presently filed embodiment contemplates to incorporate a bypass flow passage 83, in the structure of the seventh embodiment shown in FIG. 11 set forth above, for bypassing the water tank 5. The bypass flow passage 83 has one end connected to a three-way valve 93, that is disposed in the antifreeze circulation flow passage 3 upstream of the three-way valve 71, and the other end connected to the antifreeze circulation flow passage 3 upstream of the radiator 11 and downstream of the heat exchanger bypass flow passage 15. Other structures are similar to those of the seventh embodiment.

Figure 19:
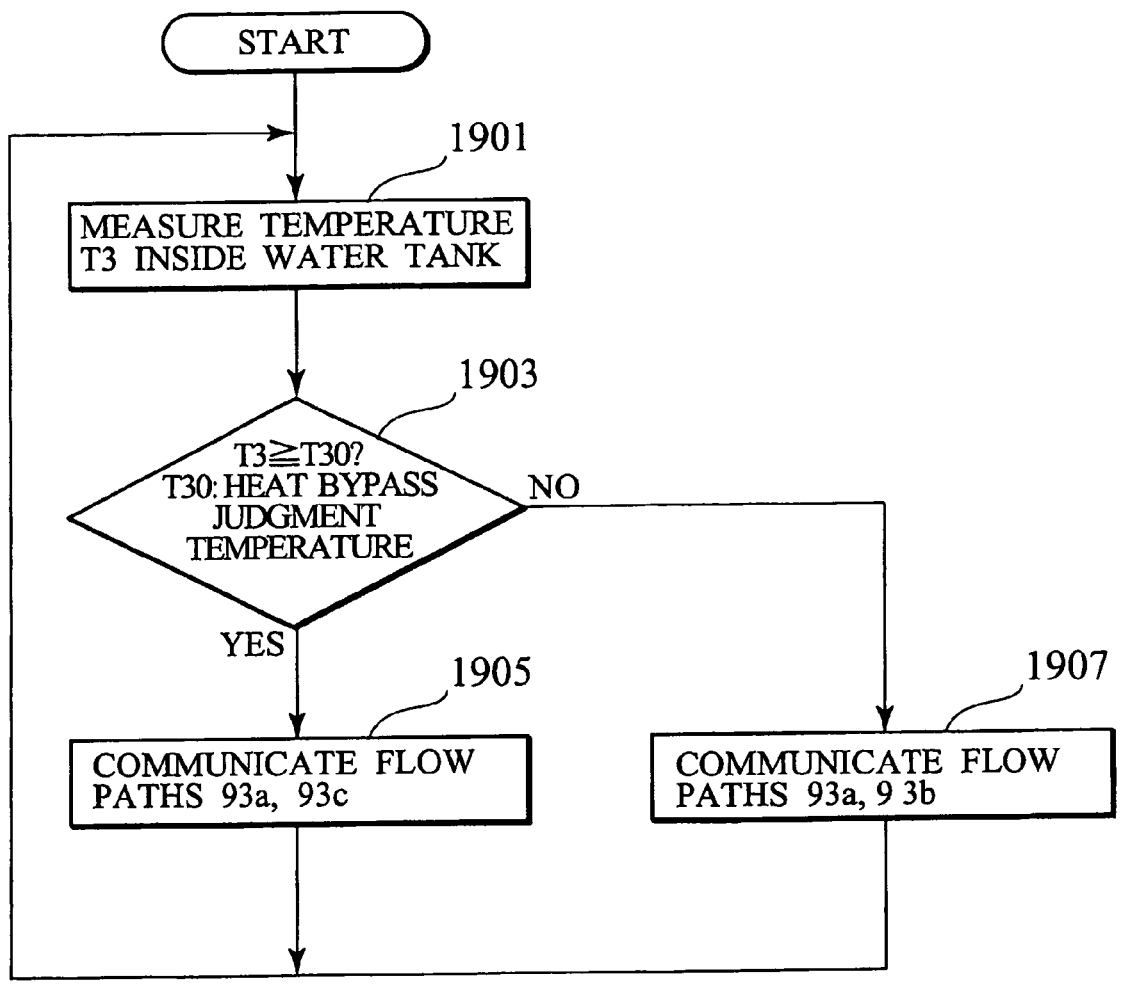
FIG. 19 is a flowchart illustrating a basic sequence of operations of the eleventh embodiment.

In such case, an initial condition is set a situation where flow paths 93a, 93c of the three-way valve 93 communicate one another, that is, a situation where antifreeze solution is admitted through the bypass flow passage 83, and operations are executed in accordance with a flowchart of FIG. 19.

That is, first, the water (or ice) temperature T3 of the water tank 5 is measured by the temperature gage 41 (step 1901).

Next, resulting detected temperature T3 is compared with the bypass judgment temperature T30 (step 1903) and, if T3>T30, judgment is made that there is no need for heating the water tank S on the supposition that the water temperature of the water tank 5 exceeds a prescribed value whereupon the flow paths 93a, 93c continues to communicate one another while antifreeze solution is passed to the bypass flow passage 83 so as to bypass the water tank 5 (step 1905).

Meanwhile, if no situation stand for T3≧T30, judgment is made that there is a need for heating the water tank 5 on the supposition that the water temperature of the water tank 5 is below the preset value, and the flow paths 93a, 93b of the three-way valve 93 communicate one another to allow antifreeze solution to be supplied to the hot medium flow supply passage 25 of the water tank 5.

Consequently, with the presently filed embodiment, if there is no need for heating water in the water tank 5, since no antifreeze solution is required to flow through the hot medium flow passage 25, a pressure loss in the flow passage due to flow of antifreeze solution can be minimized and a load of an antifreeze pump, which is not shown, can be decreased, resulting in improvement in an efficiency of a whole system.

Figure 20:
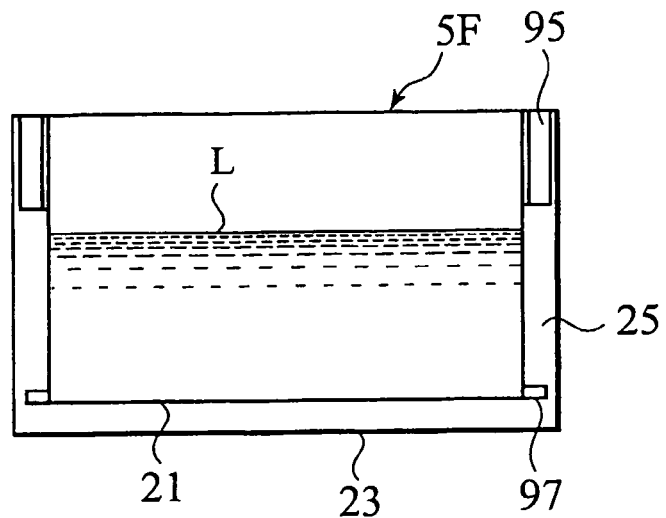
FIG. 20 is a cross sectional view of a water tank, in a fuel cell device of a twelfth embodiment according to the present invention, wherein antifreeze solution is introduced into a hot medium flow passage.

FIG. 20 is a cross sectional view of a water tank 5F for use in a fuel cell device of a twelfth embodiment of the present invention. The water tank 5F of the presently filed embodiment takes the form of a double-layer structure, comprised of the inside tank component 21 and the outside tank component 23, like the one of the first embodiment shown in FIGS. 1 to 3, between which the hot medium flow passage 25 is defined to allow antifreeze solution to flow.

Figure 22:
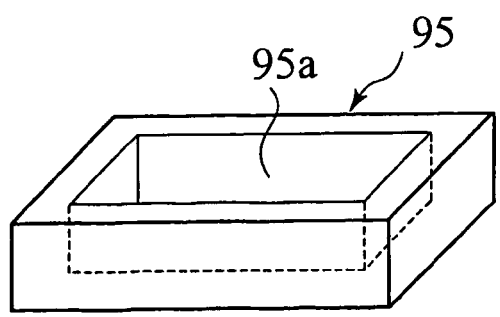
FIG. 22 is a perspective view of a heat insulation member to be accommodated in the hot medium flow passage of the twelfth embodiment.

The hot medium flow passage 25 accommodates therein a heat insulation member 95 which is shown in a perspective view in FIG. 22. The heat insulation member 95 has a center formed with a through-bore 95a, so that it is accommodated in a space (hot medium flow passage 25) between a peripheral side wall of the inside tank component 21 and a peripheral side wall of the outside tank component 23, and is formed of material with a specific gravity greater than that of air but less than that of antifreeze solution to be moveable in the vertical direction.

Figure 21:
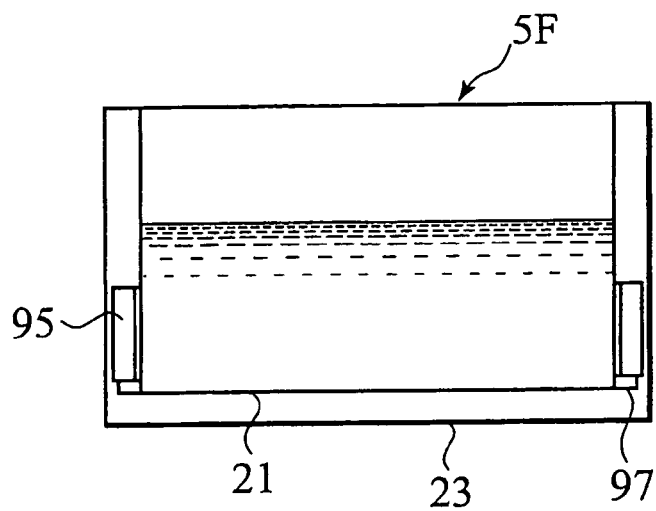
FIG. 21 is a cross sectional view of the water tank, in the fuel cell device of the twelfth embodiment according to the present invention, wherein air is admitted to the hot medium flow passage.

For this reason, in FIG. 20, the heat insulation member 95 is floating upward in antifreeze solution and, in FIG. 21, the heating insulation member 95 in air is located downward in the hot medium flow passage 25.

A stopper member 97 is mounted in the inside tank component 21 to support the heat insulation member 95 during downward movement of the heat insulation member 95. Outer peripheral sides of the stopper member 97 are positioned apart from opposing inner peripheral walls of the outside tank component 23, thereby allowing antifreeze solution or air to flow out of the antifreeze solution outlet 29. The heat insulation member 95 is made of material such as styrol foam and evacuated heat insulation material with core material composed of silica powder.

As shown in FIG. 20, if antifreeze solution is introduced into the hot medium flow passage 25, the heat insulation member 95 moves upward (floats) and prevents heat from escaping to the space (an upper area above a water level L) in the inside tank component 21, thereby promoting thawing or heating.

Meanwhile, if air is introduced into the hot medium flow passage 25 as shown in FIG. 21, the heat insulation member 95 moves downward to decrease the degree of heat dissipation from water, thereby improving a heat dissipating effect.

Consequently, according to the presently filed embodiment, it is possible to improve a thawing property, a heating property and a heat insulation property.

Figure 23:
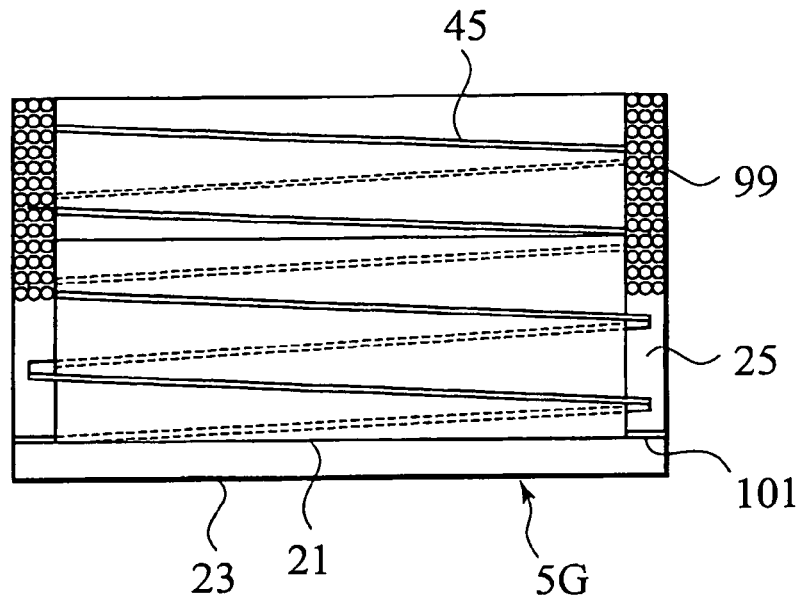
FIG. 23 is a cross sectional view of a water tank, in a fuel cell device of a thirteenth embodiment according to the present invention, wherein antifreeze solution is admitted to a hot medium flow passage.
Figure 24:
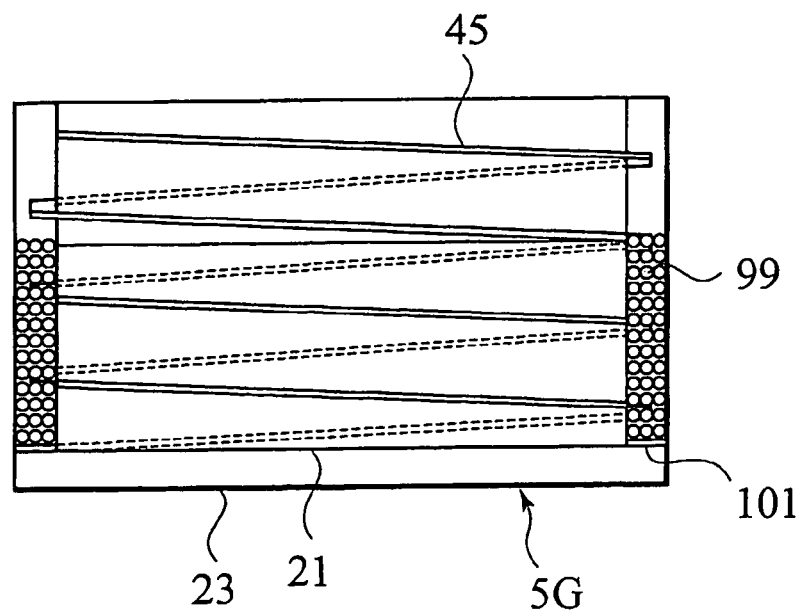
FIG. 24 is a cross sectional view of the water tank, in the fuel cell device of the thirteenth embodiment according to the present invention, wherein air is admitted to the hot medium flow passage.

FIGS. 23 and 24 are cross sectional views of a water tank 5G for use in a fuel cell device of a thirteenth embodiment of the present invention. The water tank 5G of the presently filed embodiment takes the form of a double-layer structure, comprised of the inside tank component 21 and the outside tank component 23, like the one of the first embodiment shown in FIGS. 1 to 3, between which the hot medium flow passage 25 is defined to allow antifreeze solution to flow.

In place of the heat insulation member 95 of the twelfth embodiment shown in FIG. 22 set forth above, a plurality of spherical heat insulation members 99, that form a plurality of members smaller than the flow sectional area of the hot medium flow passage 25 between the inside tank component 21 and the outside tank component 23, are accommodated in the hot medium flow passage 25.

These heat insulation members 99 are formed of material with a specific gravity greater than that of air but less than that of antifreeze solution like the heat insulation member 95 of FIG. 22 set forth above. Accordingly, when antifreeze solution is introduced in the hot medium flow passage 25, the heat insulation members 99 take a state wherein they are floating upward as shown in FIG. 23 and, when air is introduced in the hot medium flow passage 25, the heat insulation members 99 take a sinking state as shown in FIG. 24. To prevent the heat insulation members 99 from escaping from the antifreeze solution outlet 29 in such a case, the inside tank component 21 is provided at its lower portion with a heat-insulation member escape block member 101. The heat-insulation member escape block member 101 may be comprised of a net-like configuration.

Accordingly, the heat insulation members 99 of the presently filed embodiment are able to move upward when antifreeze solution is introduced and to move downward when air is introduced even in a case where the spiral shaped antifreeze rectification plate 45 as in the embodiment shown in FIG. 5 set forth above, thereby enabling a compromise between an improved heat exchange efficiency of the antifreeze rectification plate 45 and a thawing property, humidifying property and a heat insulation improvement of the heat insulation members 99.

INDUSTRIAL APPLICABILITY

As set forth above, according to the present invention, due to an ability of antifreeze solution, heated by the antifreeze heating means, permitted to flow through the hot medium flow passage located in the water storage means, even if water stored in the water storage means is frozen, frozen water can be rapidly thawed by heated antifreeze solution in an efficient manner.

The entire content of Japanese Application No. P2002-246873 with a filing date of Aug. 27, 2002 is herein incorporated by reference.

Although the present disclosure has been described above by reference to certain embodiments of the invention, the invention is not limited to the embodiments described above and modifications will occur to those skilled in the art, in light of the teachings. The scope of the invention is defined with reference to the following claims.

The invention claimed is:

1. A fuel cell device comprising:
   a fuel cell cooled by antifreeze solution;
   a water storage unit adapted to store water to be supplied to the fuel cell;
   a radiator adapted to cool the antifreeze solution that cooled the fuel cell;
   an antifreeze heater disposed in an antifreeze circulation flow passage to heat the antifreeze solution;
   a first antifreeze circulation flow passage adapted to circulate the antifreeze solution through the fuel cell and the radiator;
   a second antifreeze circulation flow passage adapted to circulate the antifreeze solution through the fuel cell, the water storage unit and the antifreeze heater, by bypassing the radiator; and
   a hot medium flow passage disposed around and conforming, in a contacting relationship, to a water contact section on an outside of the water storage unit to allow the antifreeze solution, heated by the antifreeze heater, to flow around the outside of the water storage unit.

2. The fuel cell device according to claim 1, further comprising:
   a water pump adapted to draw water, stored in the water storage unit, to an outside; and
   a suction conduit heater section disposed around a periphery of a water suction conduit of the water pump to allow the heated antifreeze solution to flow.

3. The fuel cell device according to claim 1, further comprising:
   an antifreeze rectification plate disposed in the hot medium flow passage to guide a flow of the antifreeze solution therealong.

4. The fuel cell device according to claim 1, wherein the hot medium flow passage is disposed along at least a portion of an inner wall of the water storage unit.

5. The fuel cell device according to claim 1, wherein the hot medium flow passage is formed in a plurality of flow passage components that are stacked and water tightly sealed, and the plurality of flow passage components form at least a portion of a side wall of the water storage unit.

6. The fuel cell device according to claim 4, wherein the hot medium flow passage is formed in a spiral shape.

7. The fuel cell device according to claim 1, wherein the hot medium flow passage has an antifreeze solution inlet, through which the antifreeze solution flows in, located at a higher position than an antifreeze solution outlet, through which the antifreeze solution flows out.

8. The fuel cell device according to claim 1, further comprising:
a switch-over unit adapted to expel the antifreeze solution from the hot medium flow passage to allow air to be admitted to the hot medium flow passage in place of the expelled antifreeze solution.

9. The fuel cell device according to claim 8, further comprising:
an antifreeze accommodating unit that, when the hot medium flow passage is admitted with air in place of the antifreeze solution, allows the air to expel the antifreeze solution such that the expelled antifreeze solution is accommodated.

10. The fuel cell device according to claim 8, wherein the air to be admitted to the hot medium flow passage in place of the antifreeze solution includes combustion gas resulting from a combustor disposed in the antifreeze heater.

11. The fuel cell device according to claim 8, further comprising an air storage unit storing air to be introduced into the hot medium flow passage in place of the antifreeze solution.

12. The fuel cell device according to claim 8, further comprising:
an antifreeze temperature detector adapted to detect the temperature of the antifreeze solution in the hot medium flow passage; wherein
when the temperature of the antifreeze solution is detected to fall in a value higher than 0° C. and lower than α° C. (α: heat capacity reference temperature of the antifreeze solution), the antifreeze temperature detector controls a hot medium change-over unit so as to allow the air to be admitted to the hot medium flow passage in place of the antifreeze solution.

13. The fuel cell device according to claim 1, further comprising:
a water temperature detector adapted to detect a water temperature in the water storage unit; and
a bypass unit adapted to bypass the hot medium flow passage; wherein
when the detected water temperature exceeds a preset value, the water temperature detector controls the bypass unit to allow the antifreeze solution to bypass the hot medium flow passage.

14. The fuel cell device according to claim 8, wherein the water storage unit includes a double-layer structure comprising an inside tank component and an outside tank component, between which the hot medium flow passage is formed, and wherein a heat insulation member with a specific gravity greater than the air and less than the antifreeze solution is moveably received in the hot medium flow passage.

15. The fuel cell device according to claim 14, wherein the heat insulation member includes a plurality of members smaller in size than a flow sectional area of the hot medium flow passage formed between the inside tank component and the outside tank component.

16. The fuel cell device according to claim 1, wherein the antifreeze solution heated by the antifreeze heater heats the fuel cell and heats the water in the water storage unit while flowing through the hot medium flow passage.

17. A fuel cell device comprising:
a fuel cell cooled by antifreeze solution;
a water storing means for storing water to be supplied to the fuel cell;
a radiating means for cooling the antifreeze solution that cooled the fuel cell;
antifreeze heating means for heating the antifreeze solution flowing through an antifreeze circulation means;
first antifreeze circulation flow passage means for circulating the antifreeze solution through the fuel cell and the radiating means;
second antifreeze circulation flow passage means for circulating the antifreeze solution through the fuel cell the water storing means and the antifreeze heating means, by bypassing the radiating means; and
hot medium flow passage means disposed around and conforming, in a contacting relationship, to a water contact section on an outside of the water storing means to allow the antifreeze solution, heated by the antifreeze heating means, to flow around the outside of the water storing means.

* * * * *